(12) United States Patent
Cha et al.

(10) Patent No.: US 12,181,593 B2
(45) Date of Patent: *Dec. 31, 2024

(54) METHOD FOR TRANSMITTING AND RECEIVING SIGNAL AND DEVICE SUPPORTING SAME IN WIRELESS COMMUNICATION SYSTEM

(71) Applicant: LG ELECTRONICS INC., Seoul (KR)

(72) Inventors: Hyunsu Cha, Seoul (KR); Jeongsu Lee, Seoul (KR); Kijun Kim, Seoul (KR); Hyunsoo Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/223,470

(22) Filed: Jul. 18, 2023

(65) Prior Publication Data
US 2024/0004019 A1    Jan. 4, 2024

Related U.S. Application Data

(63) Continuation of application No. 17/943,098, filed on Sep. 12, 2022, now Pat. No. 11,754,659, which is a continuation of application No. PCT/KR2021/004943, filed on Apr. 20, 2021.

(60) Provisional application No. 63/025,932, filed on May 15, 2020, provisional application No. 63/012,903, filed on Apr. 20, 2020.

(51) Int. Cl.
*G01S 5/00* (2006.01)
*H04L 5/00* (2006.01)

(52) U.S. Cl.
CPC .......... *G01S 5/0036* (2013.01); *H04L 5/0051* (2013.01)

(58) Field of Classification Search
CPC ... G01S 5/0036; H04L 5/0051; H04L 5/0048; H04W 64/00; H04W 24/10; H04W 72/56
See application file for complete search history.

(56) References Cited

U.S. PATENT DOCUMENTS

| | | |
|---|---|---|
| 2018/0310237 A1 | 10/2018 | Kumar et al. |
| 2020/0014487 A1 | 1/2020 | Akkarakaran et al. |
| 2022/0187411 A1* | 6/2022 | Manolakos ....... H04W 72/0453 |

(Continued)

FOREIGN PATENT DOCUMENTS

| | | |
|---|---|---|
| CN | 109845137 A | 6/2019 |
| IN | 201927040915 | 2/2020 |
| WO | 2015/122723 A1 | 8/2015 |

OTHER PUBLICATIONS

Qualcomm Incorporated (Rapporteur), "Report of email discussion [96#53][LTE/eNB-IOT] Positioning LPP", R2-1701108, 3GPP TSG-RAN WG2 Meeting #97, Athens, Greece, Feb. 13-17, 2017.

*Primary Examiner* — Kabir A Timory
(74) *Attorney, Agent, or Firm* — BRYAN CAVE LEIGHTON PAISNER LLP

(57) ABSTRACT

Various embodiments relate to a next-generation wireless communication system for supporting higher data transmission rates or the like than 4th generation (4G) wireless communication systems. According to various embodiments, a method for transmitting and receiving a signal and a device supporting same in a wireless communication system may be provided, and various other embodiments may be provided.

17 Claims, 22 Drawing Sheets

(56) References Cited

U.S. PATENT DOCUMENTS

| | | | |
|---|---|---|---|
| 2022/0394432 A1* | 12/2022 | Manolakos | G01S 5/0289 |
| 2023/0269059 A1* | 8/2023 | Kuo | H04L 5/0096 370/329 |

\* cited by examiner (a)

(b)

METHOD FOR TRANSMITTING AND RECEIVING SIGNAL AND DEVICE SUPPORTING SAME IN WIRELESS COMMUNICATION SYSTEM

This application is a Continuation Application of U.S. patent application Ser. No. 17/943,098, filed on Sep. 12, 2022, which is a Continuation Application of International Application No. PCT/KR2021/004943, filed on Apr. 20, 2021, which claims the benefit of and priority to U.S. Provisional Application No. 63/012,903, filed on Apr. 20, 2020 and U.S. Provisional Application No. 63/025,932, filed on May 15, 2020, the contents of which are all hereby incorporated by reference herein in their entirety.

TECHNICAL FIELD

Various embodiments of the present disclosure relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments of the present disclosure may provide a positioning method in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments of the present disclosure may provide a method of transmitting and receiving a signal in a wireless communication system and apparatus for supporting the same.

According to various embodiments, a method performed by a user equipment (UE) in a wireless communication system may be provided.

According to various embodiments, the method may include: receiving first configuration information related to a positioning reference signal (PRS); receiving second configuration information indicating a reference; and performing a measurement based on (i) the first configuration information and (ii) a priority for the measurement.

According to various embodiments, the first configuration information may include at least one of: (i) information related to at least one PRS resource set, (ii) information related to at least one PRS resource, or (iii) information related to at least one transmission point (TP).

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as a highest priority related to the priority.

According to various embodiments, at least one PRS resource identifier (ID) may be respectively assigned to the at least one PRS resource.

According to various embodiments, the at least one PRS resource may be sorted in decreasing order of the priority.

According to various embodiments, at least one PRS resource set ID may be respectively assigned to the at least one PRS resource set.

According to various embodiments, the at least one PRS resource set may be sorted according to the priority.

According to various embodiments, at least one TP ID may be respectively assigned to the at least one TP.

According to various embodiments, the at least one TP may be sorted according to the priority.

According to various embodiments, at least one of the following may be satisfied: (i) the at least one reference PRS resource set is included in the at least one PRS resource set; (ii) the at least one reference PRS resource is included in the at least one PRS resource; or (iii) the at least one reference TP is included in the at least one TP.

According to various embodiments, based on that at least one of: (i) a number of the at least one PRS resource set, (ii) a number of the at least one PRS resource, or (iii) a number of the at least one TP exceeds a PRS processing capability of the UE, the measurement may be performed based on the priority.

According to various embodiments, a plurality of PRSs may be received based on the first configuration information.

According to various embodiments, an object for the measurement may be determined from among the plurality of PRSs based on the priority.

According to various embodiments, identifying the reference indicated by the second configuration information as the highest priority related to the priority may include identifying at least one of: (i) the at least one reference PRS resource set, (ii) the at least one reference PRS resource, or (iii) the at least one reference TP as the highest priority related to the priority.

According to various embodiments, a UE operating in a wireless communication system may be provided.

According to various embodiments, the UE may include: a transceiver; and at least one processor coupled with the transceiver.

According to various embodiments, the at least one processor may be configured to: receive first configuration information related to a PRS; receive second configuration information indicating a reference; and perform a measurement based on (i) the first configuration information and (ii) a priority for the measurement.

According to various embodiments, the first configuration information may include at least one of: (i) information related to at least one PRS resource set, (ii) information related to at least one PRS resource, or (iii) information related to at least one TP.

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as a highest priority related to the priority.

According to various embodiments, at least one PRS resource ID may be respectively assigned to the at least one PRS resource.

According to various embodiments, the at least one PRS resource may be sorted in decreasing order of the priority.

According to various embodiments, the at least one processor may be further configured to communicate with at least one of: a mobile terminal, a network, or an autonomous driving vehicle other than a vehicle including the UE.

According to various embodiments, a method performed by a base station (BS) in a wireless communication system may be provided.

According to various embodiments, the method may include: transmitting first configuration information related to a PRS; transmitting second configuration information indicating a reference; and in response to the first configuration information, receiving information regarding a measurement related to positioning, According to various embodiments, the measurement may be based on a priority for the measurement.

According to various embodiments, the first configuration information may include at least one of: (i) information related to at least one PRS resource set, (ii) information related to at least one PRS resource, or (iii) information related to at least one TP.

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as a highest priority related to the priority.

According to various embodiments, a BS operating in a wireless communication system may be provided.

According to various embodiments, the BS may include: a transceiver; and at least one processor coupled with the transceiver.

According to various embodiments, the at least one processor may be configured to: transmit first configuration information related to a PRS; transmit second configuration information indicating a reference; and in response to the first configuration information, receive information regarding a measurement related to positioning.

According to various embodiments, the measurement may be based on a priority for the measurement.

According to various embodiments, the first configuration information may include at least one of: (i) information related to at least one PRS resource set, (ii) information related to at least one PRS resource, or (iii) information related to at least one TP.

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as a highest priority related to the priority.

According to various embodiments, an apparatus operating in a wireless communication system may be provided.

According to various embodiments, the apparatus may include: at least one processor; and at least one memory configured to store at least one instruction that causes the at least one processor to perform a method.

According to various embodiments, the method may include: receiving first configuration information related to a PRS; receiving second configuration information indicating a reference; and performing a measurement based on (i) the first configuration information and (ii) a priority for the measurement.

According to various embodiments, the first configuration information may include at least one of: (i) information related to at least one PRS resource set, (ii) information related to at least one PRS resource, or (iii) information related to at least one TP.

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as a highest priority related to the priority.

According to various embodiments, a processor-readable medium configured to store at least one instruction that causes at least one processor to perform a method may be provided.

According to various embodiments, the method may include: receiving first configuration information related to a PRS; receiving second configuration information indicating a reference; and performing a measurement based on (i) the first configuration information and (ii) a priority for the measurement.

According to various embodiments, the first configuration information may include at least one of: (i) information related to at least one PRS resource set, (ii) information related to at least one PRS resource, or (iii) information related to at least one TP.

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as a highest priority related to the priority.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments, a signal may be effectively transmitted and received in a wireless communication system.

According to various embodiments, positioning may be effectively performed in a wireless communication system.

According to various embodiments, when a positioning reference signal (PRS) is configured in excess of the capability of a user equipment (UE), an operation related to positioning may be provided without ambiguity.

According to various embodiments, it is possible to provide a method of determining a PRS to be measured preferentially and/or a priority thereof when PRSs are configured in excess of the capability of a UE.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a user equipment (UE) receives information from a base station (BS) in downlink (DL) and transmits information to the BS in uplink (UL). The information transmitted and received between the UE and BS includes general data information and various types of control information. There are many physical channels according to the types/usages of information transmitted and received between the BS and UE.

Figure 1:
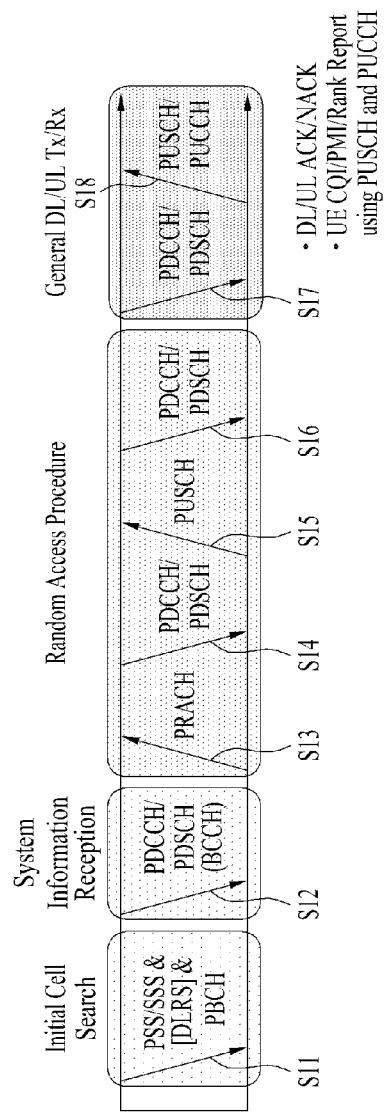
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When a UE is powered on or enters a new cell, the UE performs initial cell search including acquisition of synchronization with a BS in step S11. To this end, the UE receives a synchronization signal block (SSB) from the BS. The SSB includes a primary synchronization signal (PSS), a secondary synchronization signal (SSS), and a physical broadcast channel (PBCH). The UE synchronizes with the BS based on the PSS/SSS and acquires information such as a cell identity. The UE may obtain intra-cell broadcast information based on the PBCH. Meanwhile, the UE may check the state of a DL channel by receiving a downlink reference signal (DL RS) in the initial cell search.

After the initial cell search, the UE may acquire more specific system information by receiving a physical downlink control channel (PDCCH) and receiving a physical downlink shared channel (PDSCH) based on information of the PDCCH in step S12.

Subsequently, to complete connection to the BS, the UE may perform a random access procedure with the BS (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps (i.e., 2-step RACH or type-2 random access procedure) rather than in four steps as described above (i.e., 4-step RACH or type-1 random access procedure). S13/S15 may be performed as one operation in which the UE performs transmission (e.g., operation of transmitting message A including a PRACH preamble and/or a PUSCH), and S14/S16 may be performed as one operation in which the BS performs transmission (e.g., operation of transmitting message B including an RAR and/or contention resolution information).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Resource

Figure 2:
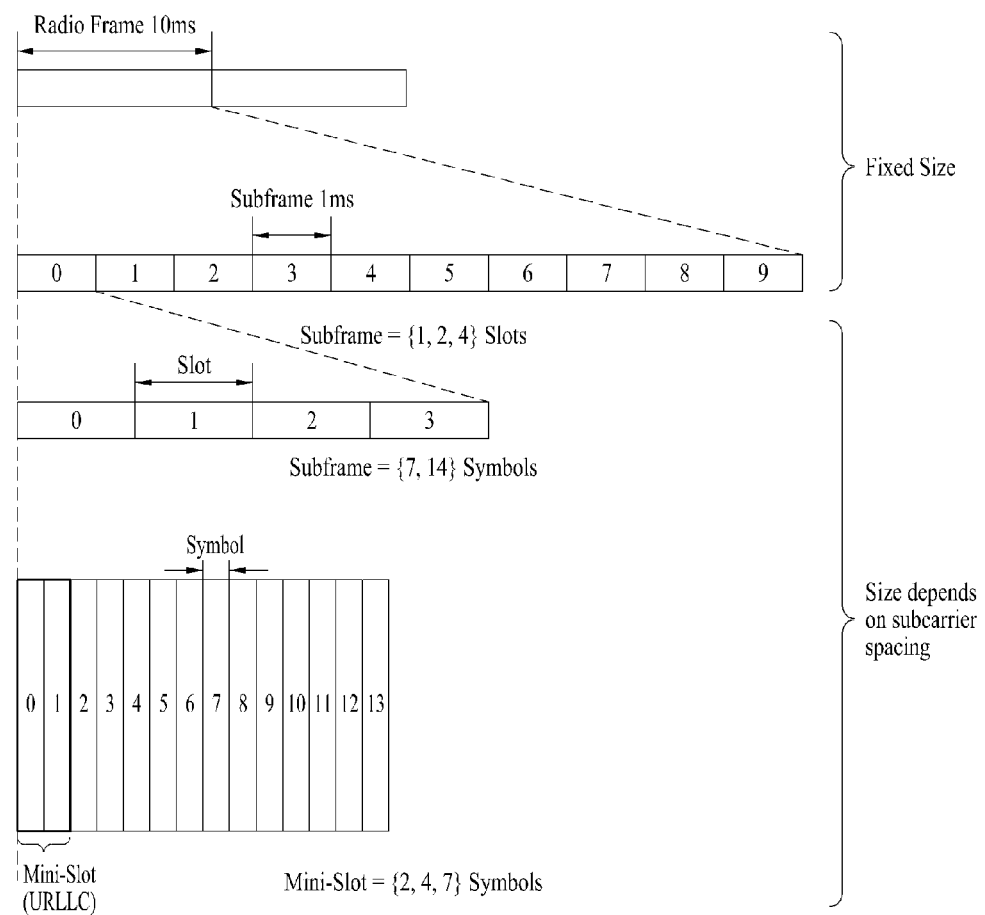
FIG. 2 is a diagram illustrating a resource grid in a new radio (NR) system to which various embodiments are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or p). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 KHz |
| FR2 | 24250 MHz-52600 MHZ | 60, 120, 240 KHz |

Regarding a frame structure in the NR system, the time-domain sizes of various fields are represented as multiples of a basic time unit for NR, $T_c=1/(\Delta f_{max} \cdot N_f)$ where $\Delta f_{max}=480 \cdot 10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz}) \cdot 2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology y, slots are numbered with $n^\mu_s \in \{0, \ldots, N^{slot,\mu}_{subframe}-1\}$ in an increasing order in a subframe, and with $n^\mu_s \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

For physical resources in the NR system, an antenna port, a resource grid, a resource element, a resource block, a carrier part, etc. may be considered. Hereinafter, the physical resources considered in the NR system will be described in detail.

First, an antenna port may be defined such that a channel that conveys a symbol on the antenna port is inferred from a channel that conveys another symbol on the same antenna port. When the large-scale properties of a channel conveying a symbol on an antenna port are inferred from a channel carrying a symbol on another antenna port, the two antenna ports may be said to be in the quasi co-located or quasi co-location (QCL) relationship. The large-scale properties may include at least one of the following parameters: delay spread, Doppler spread, frequency shift, average received power, received timing, average delay, or spatial reception (Rx). Here, the spatial Rx parameter refers to a spatial (RX) channel property parameter such as angle of arrival.

Figure 3:
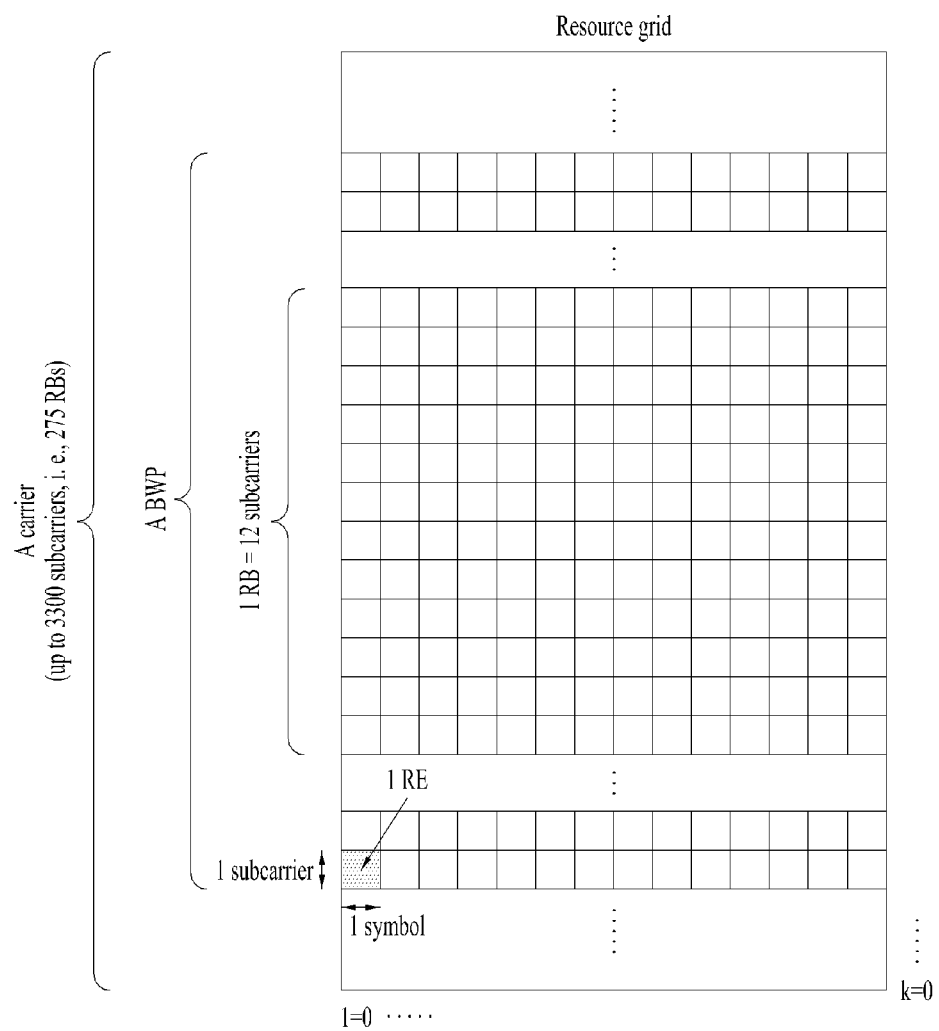
FIG. 3 is a diagram illustrating mapping of physical channels in a slot, to which various embodiments are applicable.

FIG. 3 illustrates an exemplary resource grid to which various embodiments are applicable.

Referring to FIG. 3, a resource grid consisting of $N^{size,\mu}_{grid} \times N^{RB}_{sc}$ subcarriers and $14 \times 2^\mu$ OFDM symbols may be defined for each subcarrier spacing (SCS) and carrier, where $N^{size,\mu}_{grid}$ is indicated by RRC signaling from the BS. $N^{size,\mu}_{grid}$ may vary not only depending on the SCS configuration μ but also between UL and DL. One resource grid exists for the SCS configuration μ, antenna port p, and transmission direction (i.e., UL or DL). Each element in the resource gird for the subcarrier spacing configuration u and antenna port p may be referred to as a resource element and identified uniquely by an index pair of (k,l), where k denotes an index in the frequency domain and l denotes a symbol position in the frequency domain relative to a reference point. The resource element (k,l) for the subcarrier spacing configuration μ and antenna port p may be a physical resource and a complex value, $a^{(p,\mu)}_{k,l}$. A resource block (RB) is defined as $N^{RB}_{sc}$ consecutive subcarriers in the frequency domain (where $N^{RB}_{sc}=12$).

Considering that the UE is incapable of supporting a wide bandwidth supported in the NR system, the UE may be configured to operate in a part of the frequency bandwidth of a cell (hereinafter referred to as a bandwidth part (BWP)).

Figure 4:
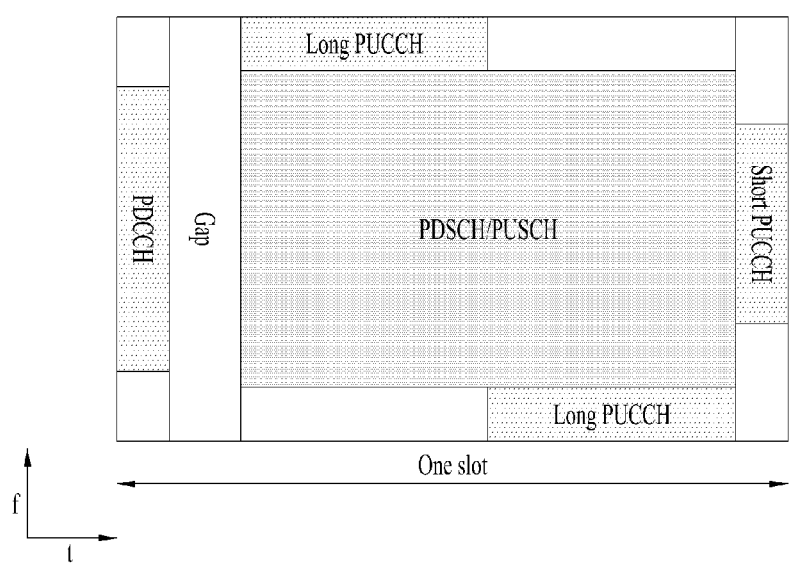
FIG. 4 is a diagram illustrating an example of mapping physical channels to a slot to which various embodiments of the present disclosure are applicable.

FIG. 4 is a diagram illustrating an example of mapping physical channels to a slot to which various embodiments of the present disclosure are applicable.

DL control channel(s), DL or UL data, and UL control channel(s) may all be included in one slot. For example, the first N symbols (hereinafter, referred to as a DL control region) of the slot may be used to transmit a DL control channel, and the last M symbols (hereinafter, referred to as a UL control region) of the slot may be used to transmit a UL control channel. N and M are each an integer greater than or equal to 0. A resource region (hereinafter, referred to as a data region) between the DL control region and the UL control region may be used for DL data transmission or UL data transmission. A time gap for DL-to-UL or UL-to-DL switching may exist between the control region and the data region. A PDCCH may be transmitted in the DL control region, and a PDSCH may be transmitted in the DL data region. Some symbols at the time of switching from DL to UL in the slot may be used as a time gap.

The BS transmits related signals to the UE on DL channels as described below, and the UE receives the related signals from the BS on the DL channels as described below.

The PDSCH conveys DL data (e.g., DL-shared channel transport block (DL-SCH TB)) and uses a modulation scheme such as quadrature phase shift keying (QPSK), 16-ary quadrature amplitude modulation (16 QAM), 64 QAM, or 256 QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner The PUCCH delivers UCI, an HARQ-ACK, and/or an SR and is classified as a short PUCCH or a long PUCCH according to the transmission duration of the PUCCH. Table 7 lists exemplary PUCCH formats.

1.3. Uplink Power Control

In wireless communication systems, it may be necessary to increase or decrease the transmission power of a UE and/or a mobile device depending on situations. Controlling the transmission power of the UE and/or mobile device may be referred to as UL power control. For example, transmission power control may be applied to satisfy requirements (e.g., signal-to-noise ratio (SNR), bit error ratio (BER), block error ratio (BLER), etc.) of a BS (e.g., gNB, eNB, etc.).

The above-described power control may be performed according to an open-loop power control method and a closed-loop power control method.

Specifically, the open-loop power control method refers to a method of controlling transmission power without feedback from a transmitting device (e.g., BS, etc.) to a receiving device (e.g., UE, etc.) and/or feedback from the receiving device to the transmitting device.

For example, the UE may receive a specific channel/signal (pilot channel/signal) from the BS and estimate the strength of received power based on the received channel/signal. Then, the UE may control the transmission power based on the strength of the estimated received power.

On the other hand, the closed-loop power control method refers to a method of controlling transmission power based on feedback from a transmitting device to a receiving device and/or feedback from the receiving device to the transmitting device. For example, the BS receives a specific channel/signal from the UE and determines an optimal power level of the UE based on a power level, SNR, BER, BLER, etc. which are measured based on the received specific channel/signal. The BS may transmit information (i.e., feedback) on the determined optimal power level to the UE on a control channel, and the UE may control the transmission power based on the feedback provided by the BS.

Hereinafter, power control methods for cases in which a UE and/or a mobile device perform UL transmission to a BS in a wireless communication system will be described in detail. Specifically, power control methods for transmission of a sounding reference signal (SRS) will be described. In this case, a transmission occasion (i.e., transmission time unit) (i) for the SRS may be defined by a slot index (n_s) in a frame of a system frame number (SFN), a first symbol(S) in a slot, the number of consecutive symbols (L), and so on.

Power Control of SRS

In relation to SRS transmission in an active UL BWP of a carrier (f) of a serving cell (c), the UE may calculate a linear power value of transmission power determined by Equation A below. Thereafter, the UE may control the transmission power by equally dividing the calculated linear power value over antenna port(s) configured for the SRS.

Specifically, when the UE performs SRS transmission in an active UL BWP (b) of the carrier (f) of the serving cell (c) using an SRS power control adjustment state based on index 1, the UE may determine SRS transmission power $P_{SRS,b,f,c}(i, q, l)$ (dBm) on an SRS transmission occasion (i) based on Equation A below.

[Equation A]

$$P_{SRS,b,f,c}(i, q_s, l) = \min \begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix}$$

In Equation A, q_s denotes the index of an open-loop power control parameter (e.g., P_o, alpha (α), a DL RS resource for a path loss (PL) measurement (e.g., $PL_{b,f,c}(q_d)$), etc.), which may be configured for SRS resource set. Index 1 denotes the index of a closed-loop power control process, and the corresponding index may be configured independently of a PUSCH or configured in relation to the PUSCH. If SRS power control is not related to the PUSCH, the maximum number of closed-loop power control processes for the SRS may be 1.

In addition, P_o (e.g., $P_{o\_SRS,b,f,c}(q_s)$) is a parameter broadcast as part of system information and may denote target received power of the receiver. The corresponding P_o value may be configured in consideration of UE throughput, cell capacity, noise and/or interference, etc. Alpha (e.g., $\alpha_{SRS,b,f,c}(q_s)$) may denote a rate for compensating for PL. Alpha may have a value from 0 to 1, and full pathloss compensation or fractional pathloss compensation may be performed according to the configured value. In this case, the alpha value may be configured in consideration of interference between UEs and/or data rates. In addition, $P_{CMAX,f,c}(i)$ may denote configured UE transmission power. For example, the configured UE transmission power may be interpreted as 'configured maximum UE output power' defined in 3GPP TS 38.101-1 and/or TS 38.101-2. $M_{SRS,b,f,c}(i)$ may denote an SRS resource allocation bandwidth, which is expressed by the number of RBs in the SRS transmission occasion based on an SCS (μ). In addition, $h_{b,f,c}(i, l)$, which is related to SRS power control adjustment states, may be configured or indicated based on a TPC command field of DCI received or detected by the UE (e.g., DCI format 2_3, etc.) and/or an RRC parameter (e.g., srs-PowerControlAdjustmentStates, etc.).

A resource for SRS transmission may be applied as a reference for the BS and/or UE to determine a beam, a panel, and/or a spatial domain transmission filter. Thus, SRS transmission power control may be performed in units of beams, panels, and/or spatial domain transmission filters.

The above-described parameters and/or information for SRS power control may be configured separately (independently) for each BWP. In this case, the corresponding parameters and/or information may be configured or indicated by higher layer signaling (e.g., RRC signaling, MAC-CE, etc.) and/or DCI. For example, the parameters and/or information for SRS power control may be provided by RRC signaling such as SRS-Config, SRS-TPC-Command-Config, etc. Table 5 below shows the configurations of SRS-Config and SRS-TPC-CommandConfig. The definition and details of each parameter may be found in 3GPP TS Rel.16 38.331.

TABLE 5

```
SRS-Config ::=                                       SEQUENCE {
    srs-ResourceSetToReleaseList                     SEQUENCE
(SIZE(1..maxNrofSRS-ResourceSets)) OF SRS-ResourceSetId       OPTIONAL,      -
- Need N
    srs-ResourceSetToAddModList                      SEQUENCE
(SIZE(1..maxNrofSRS-ResourceSets)) OF SRS-ResourceSet         OPTIONAL,      -
- Need N
    srs-ResourceToReleaseList                        SEQUENCE
(SIZE(1..maxNrofSRS-Resources)) OF SRS-ResourceId             OPTIONAL,
-- Need N
    srs-ResourceToAddModList                         SEQUENCE
(SIZE(1..maxNrofSRS-Resources)) OF SRS-Resource               OPTIONAL,
-- Need N
    tpc-Accumulation                                 ENUMERATED {disabled}
OPTIONAL,    -- Need S
    ...,
    SRS-ResourceSet ::=                              SEQUENCE {
    srs-ResourceSetId                                SRS-ResourceSetId,
    srs-ResourceIdList                               SEQUENCE
(SIZE(1..maxNrofSRS-ResourcesPerSet)) OF SRS-ResourceId       OPTIONAL, --
Cond Setup
    resourceType                                     CHOICE {
        aperiodic                                    SEQUENCE {
        aperiodicSRS-ResourceTrigger                 INTEGER (1..maxNrofSRS-
TriggerStates-1),
        csi-RS                                       NZP-CSI-RS-ResourceId
OPTIONAL, -- Cond NonCodebook
        slotOffset                                   INTEGER (1..32)
OPTIONAL, -- Need S
        ...,
        [[
        aperiodicSRS-ResourceTriggerList             SEQUENCE
(SIZE(1..maxNrofSRS-TriggerStates-2))
        OF INTEGER (1..maxNrofSRS-TriggerStates-1)   OPTIONAL  -- Need M
        ]]
    },
    semi-persistent                                  SEQUENCE {
        associatedCSI-RS                             NZP-CSI-RS-ResourceId
OPTIONAL, -- Cond NonCodebook
        ...
    },
    periodic                                         SEQUENCE {
        associatedCSI-RS                             NZP-CSI-RS-ResourceId
OPTIONAL, -- Cond NonCodebook
        ...
    }
    },
    usage                                            ENUMERATED
{beamManagement, codebook, nonCodebook, antennaSwitching},
    alpha                                            Alpha
OPTIONAL, -- Need S
    p0                                               INTEGER (-202..24)
```

TABLE 5-continued

```
OPTIONAL, -- Cond Setup
    pathlossReferenceRS                    PathlossReferenceRS-Config
OPTIONAL, -- Need M
    srs-PowerControlAdjustmentStates       ENUMERATED { sameAsFci2,
separateClosedLoop}              OPTIONAL, -- Need S
    ...,
    [[
    pathlossReferenceRS-List-r16           SEQUENCE
(SIZE(1..maxNrofSRS-PathlossReferenceRS-r16-1)) OF PathlossReferenceRS-
Config
    OPTIONAL -- Need M
    ]]
    }
    PathlossReferenceRS-Config ::=         CHOICE {
    ssb-Index                              SSB-Index,
    csi-RS-Index                           NZP-CSI-RS-ResourceId
    }
    SRS-PosResourceSet-r16 ::=             SEQUENCE {
    srs-PosResourceSetId-r16               SRS-PosResourceSetId-
r16,
    srs-PosResourceIdList-r16              SEQUENCE
(SIZE(1..maxNrofSRS-ResourcesPerSet)) OF SRS-PosResourceId-r16
    OPTIONAL, -- Cond Setup
    resourceType-r16                       CHOICE {
    aperiodic-r16                          SEQUENCE {
    aperiodicSRS-ResourceTriggerList-r16   SEQUENCE
(SIZE(1..maxNrofSRS-TriggerStates-1))
    OF INTEGER (1..maxNrofSRS-TriggerStates-1)  OPTIONAL, -- Need M
    slotOffset-r16                         INTEGER (1..32)
OPTIONAL, -- Need S
    ...
    },
    semi-persistent-r16                    SEQUENCE {
    ...
    },
    periodic-r16                           SEQUENCE {
    ...
    }
    },
    alpha-r16                              Alpha
OPTIONAL, -- Need S
    p0-r16                                 INTEGER (-202..24)
OPTIONAL, -- Cond Setup
    pathlossReferenceRS-Pos-r16            CHOICE {
    ssb-Index-16                           SSB-Index,
    csi-RS-Index-r16                       NZP-CSI-RS-ResourceId,
    ssb-r16                                SSB-InfoNcell-r16,
    dl-PRS-r16                             DL-PRS-Info-r16
    }
OPTIONAL, -- Need M
```

```
    ...
    }
    SRS-TPC-CommandConfig ::=              SEQUENCE {
    startingBitOfFormat2-3                 INTEGER (1..31)
OPTIONAL,    -- Need R
    fieldTypeFormat2-3                     INTEGER (0..1)
OPTIONAL,    -- Need R
    ...,
    [[
    startingBitOfFormat2-3SUL              INTEGER (1..31)
OPTIONAL     -- Need R
    ]]
    }
```

The UE may determine or calculate the SRS transmission power according to the above-described method and transmit the SRS based on the determined or calculated SRS transmission power.

1.4. QCL (Quasi Co-Located or Quasi Co-Location)

The UE may receive a list of up to M TCI-state configurations to decode a PDSCH based on a detected PDCCH with DCI intended for the UE and a given cell. Here, M depends on UE capabilities.

Each TCI-state includes parameters for establishing a QCL relationship between one or two DL RS s and DMRS ports of the PDSCH. The QCL relationship is configured by the following RRC parameters: qcl-Type1 for the first DL RS and qcl-Type2 (if configured) for the second DL RS.

The QCL type of each DL RS is given by a parameter 'qcl-Type' in QCL-Info and have one of the following values:
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}

For example, if the target antenna port is a specific non-zero power (NZP) CSI-RS, corresponding NZP CSI-RS antenna ports may be indicated/configured to be QCL with a specific tracking reference signal (TRS) in terms of QCL-Type A and QCL with a specific SSB in terms of QCL-Type D. Upon receiving the above indication/configuration, the UE may receive the corresponding NZP CSI-RS based on Doppler and delay values measured on the QCL-TypeA TRS and apply a reception beam used to receive the QCL-TypeD SSB to the reception of the corresponding NZP CSI-RS.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1 Positioning Protocol Configuration

Figure 5:
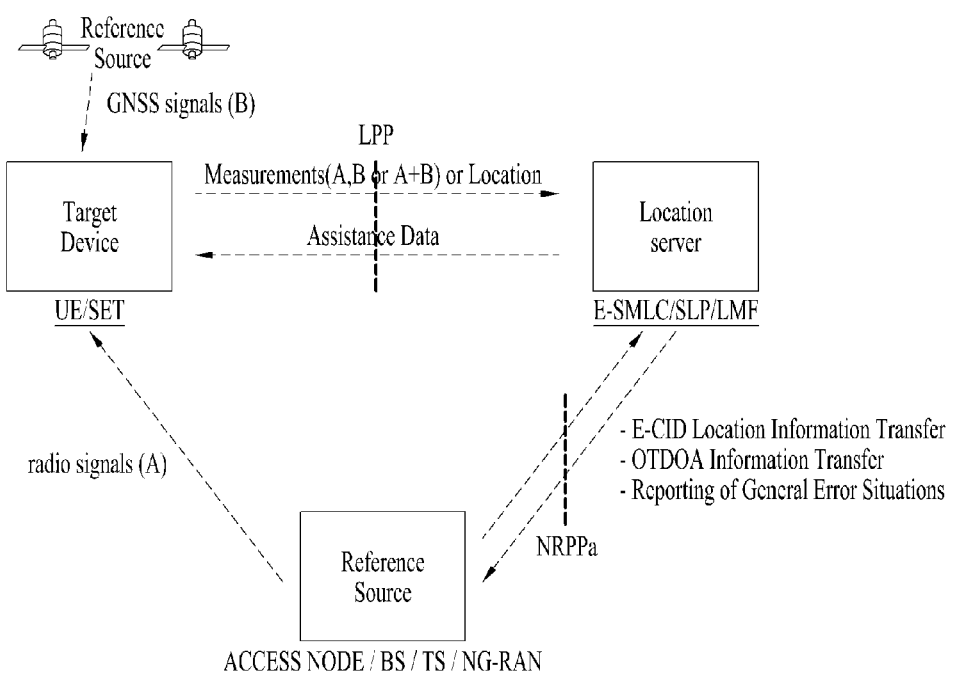
FIG. 5 is a diagram illustrating an exemplary positioning protocol configuration for user equipment (UE) positioning, which is applicable to various embodiments of the present disclosure.

FIG. 5 is a diagram illustrating an exemplary positioning protocol configuration for positioning a UE, to which various embodiments are applicable.

Referring to FIG. 5, an LTE positioning protocol (LPP) may be used as a point-to-point protocol between a location server (E-SMLC and/or SLP and/or LMF) and a target device (UE and/or SET), for positioning the target device using position-related measurements acquired from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

LTE PRS

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP. The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1)+2 \cdot (N_{ID}^{PRS} \bmod 512)+N_{CP} \quad \text{[Equation 2]}$$

Unless additionally configured by higher layers, $N_{ID}^{PRS}$ is equal to $N_{ID}^{cell}$, and $N_{CP}$ is 1 for a normal CP and 0 for an extended CP.

NR PRS

A positioning frequency layer may include one or more PRS resource sets, each including one or more PRS resources.

Sequence Generation

A PRS sequence r(m) (m=0, 1, . . . ) may be defined by Equation 3.

$$r(m) = \frac{1}{\sqrt{2}}(1 - 2c(m)) + j\frac{1}{\sqrt{2}}(1 - 2c(m+1)) \quad \text{[Equation 3]}$$

In Equation 1, c(i) may be a pseudo-random sequence. A pseudo-random sequence generator may be initialized by Equation 4.

$$c_{init} = \left(2^{22}\left\lfloor\frac{n_{ID,seq}^{PRS}}{1024}\right\rfloor + 2^{10}(N_{symb}^{slot}n_{s,f}^{\mu} + l + 1)(2(n_{ID,seq}^{PRS}\bmod 1024) + 1) + (n_{ID,seq}^{PRS}\bmod 1024)\right)\bmod 2^{31} \quad \text{[Equation 4]}$$

In Equation 4, $n_{s,f}^{\mu}$ may be a slot number in a frame in an SCS configuration μ. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs $(k,l)_{p,\mu}$, specifically by Equation 5. $(k,l)_{p,\mu}$ may represent an RE (k, l) for an antenna port p and the SCS configuration μ.

$$a_{k,l}^{(p,\mu)} = \beta_{PRS} r(m)$$

$$m = b \; 0, 1, \ldots$$

$$k = mK_{comb}^{PRS} + ((k_{offset}^{PRS} + k') \bmod K_{comb}^{PRS})$$

$$l = l_{start}^{PRS}, l_{start}^{PRS}+1, \ldots, l_{start}^{PRS}+L_{PRS}-1 \quad \text{[Equation 5]}$$

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and may be one of $\{2, 2\}$, $\{4, 2\}$, $\{6, 2\}$, $\{12, 2\}$, $\{4, 4\}$, $\{12,4\}$, $\{6, 6\}$, $\{12, 6\}$ and/or $\{12, 12\}$. An RE offset $k_{offset}^{PRS} \in \{0,1,\ldots,K_{comb}^{PRS}-1\}$ may be given by combOffset. A frequency offset k' may be a function of $l-l_{start}^{PRS}$ as shown in Table 6.

TABLE 6

| $K_{comb}^{PRS}$ | \multicolumn{12}{c}{Symbol number within the downlink PRS resource $l - l_{start}^{PRS}$} |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 6.

$$(N_{slot}^{frame,\mu} n_f + n_{s,f}^{\mu} - T_{offset}^{PRS} - T_{offset,res}^{PRS}) \bmod 2^{\mu} T_{per}^{PRS} \in \quad \text{[Equation 6]}$$

$$\{iT_{gap}^{PRS}\}_{i=0}^{T_{rep}^{PRS}-1}$$

$N_{slot}^{frame,\mu}$ may be the number of slots per frame in the SCS configuration $\mu$. $n_f$ may be a system frame number (SFN). $n_{s,f}^{\mu}$ may be a slot number in a frame in the SCS configuration $\mu$. A slot offset $T_{offset}^{PRS} \in \{0,1,\ldots,T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4,5,8,10,16,20,32,40,64,80,160,320,640,1280,2560,5120,10240\}$ may be given by a higher-layer parameter DL-PRS-Periodicity. A repetition factor $T_{rep}^{PRS} \in \{1,2,4,6,8.16,32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1,2,4,8.16,32\}$ may be given by a higher-layer parameter DL-PRS-ResourceTimeGap.

2.3. UE Positioning Architecture

Figure 6:
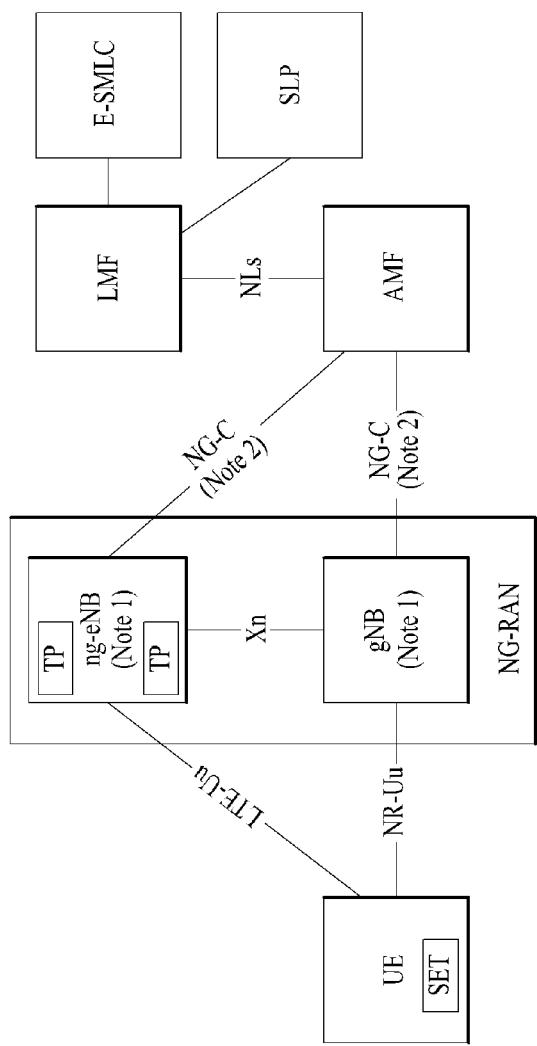
FIG. 6 is a diagram illustrating an example of an architecture of a system for positioning a UE, to which various embodiments of the present disclosure are applicable.

FIG. 6 illustrates architecture of a 5G system applicable to positioning of a UE connected to an NG-RAN or an E-UTRAN.

Referring to FIG. 6, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE.

For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 7:
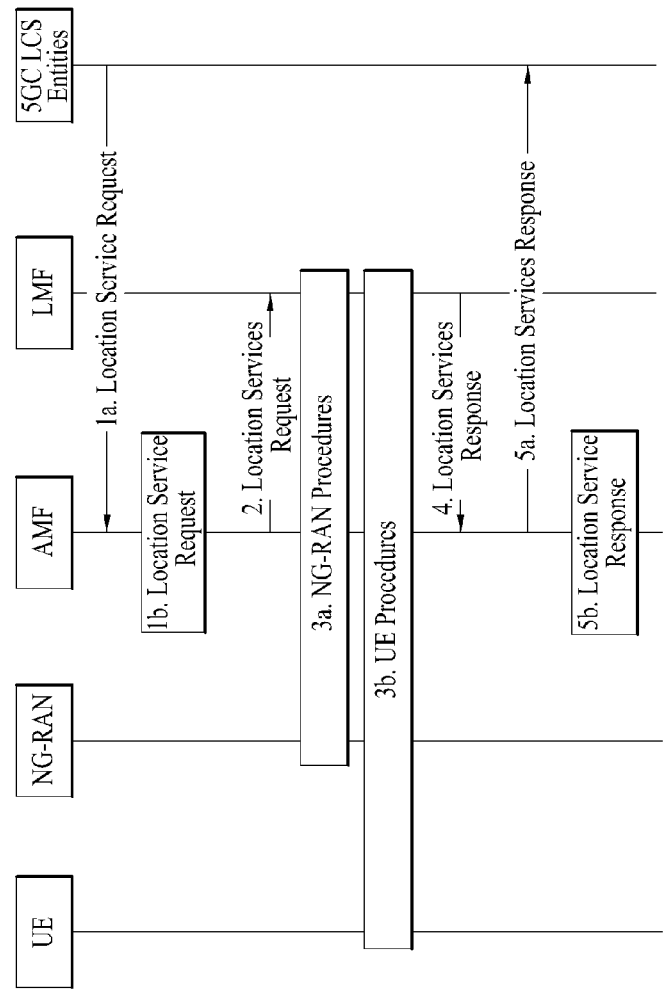
FIG. 7 is a diagram illustrating an example of a procedure of positioning a UE, to which various embodiments of the present disclosure are applicable.

FIG. 7 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 7. In other words, in FIG. 7 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 7. In step 1a, a 5 GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RS s transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 7 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol

LTE Positioning Protocol (LPP)

Figure 8:
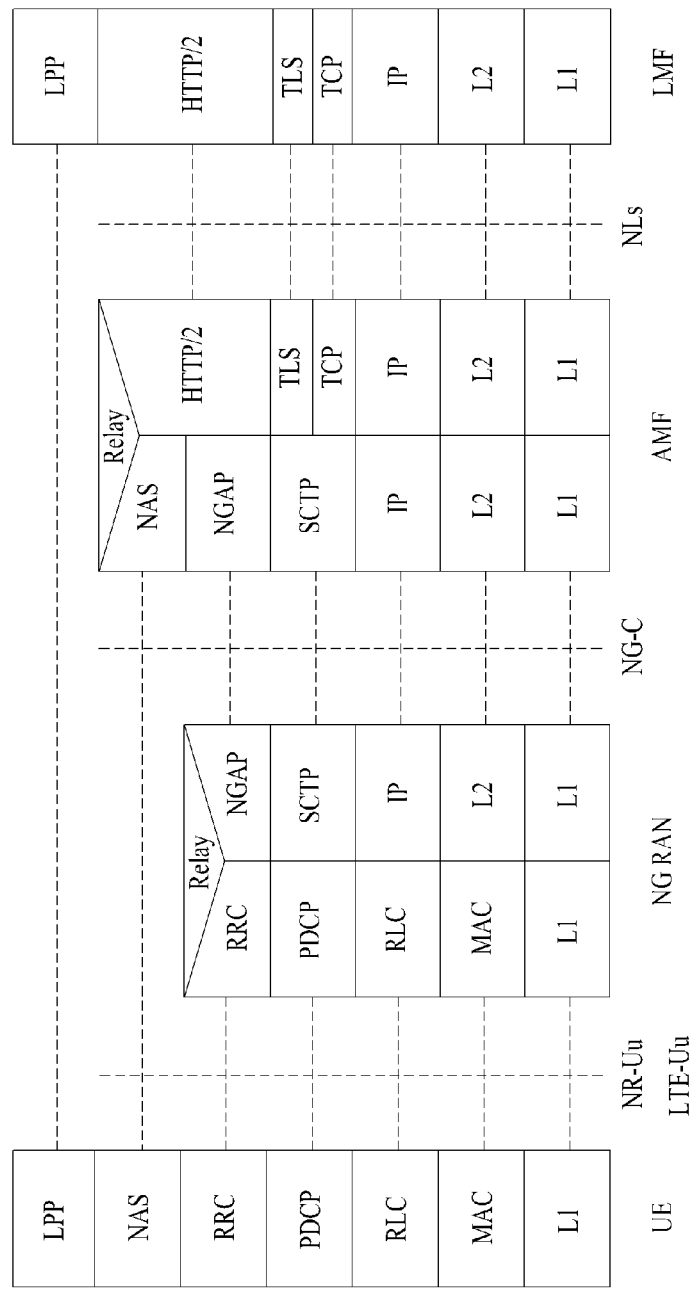
FIG. 8 is a diagram illustrating protocol layers for supporting LTE positioning protocol (LPP) message transmission, to which various embodiments are applicable.

FIG. 8 illustrates an exemplary protocol layer used to support LPP message transfer between an LMF and a UE. An LPP protocol data unit (PDU) may be carried in a NAS PDU between an AMF and the UE.

Referring to FIG. 8, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 9:
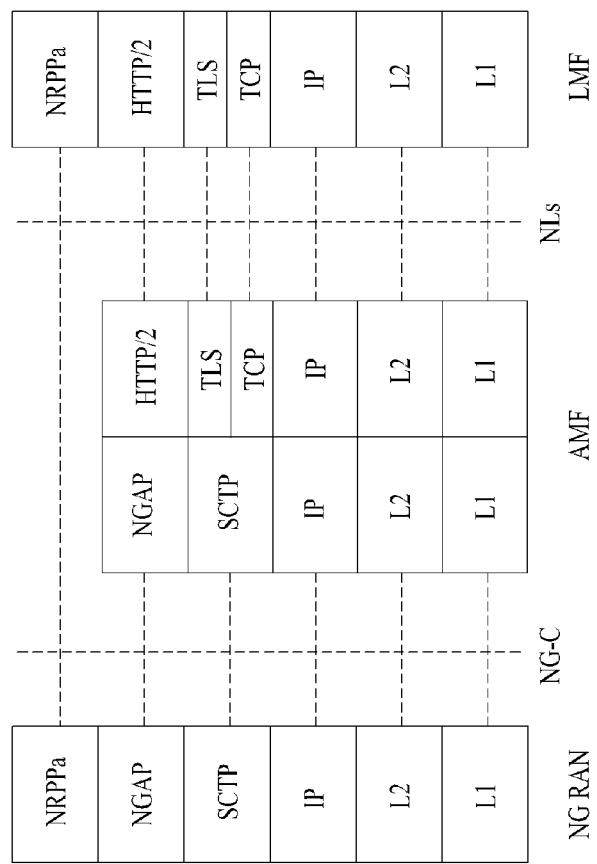
FIG. 9 is a diagram illustrating protocol layers for supporting NR positioning protocol A (NRPPa) protocol data unit (PDU) transmission, to which various embodiments are applicable.

FIG. 9 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference of Arrival)

Figure 10:
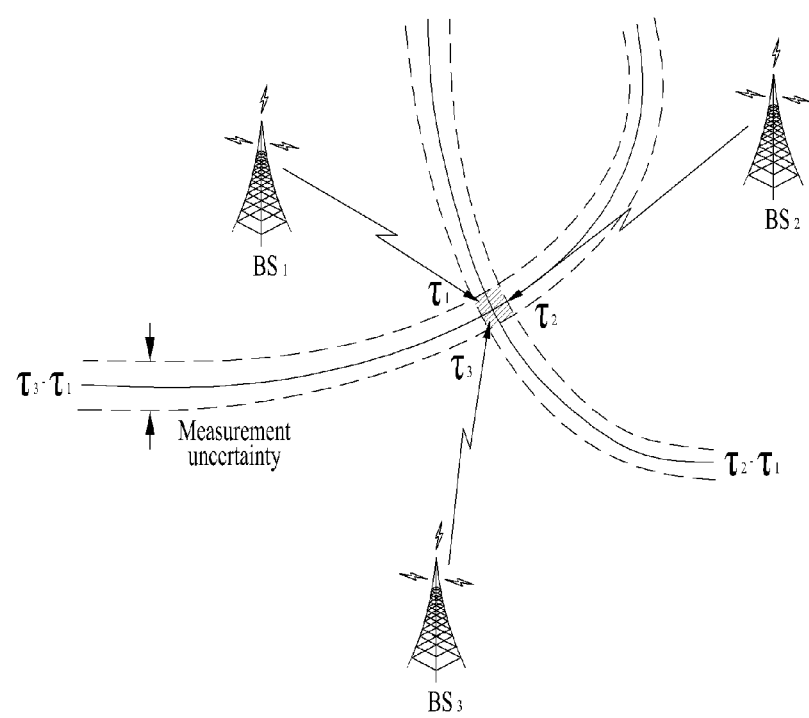
FIG. 10 is a diagram illustrating an observed time difference of arrival (OTDOA) positioning method, to which various embodiments are applicable.

FIG. 10 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 7 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 7]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and n, and n, are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 11:
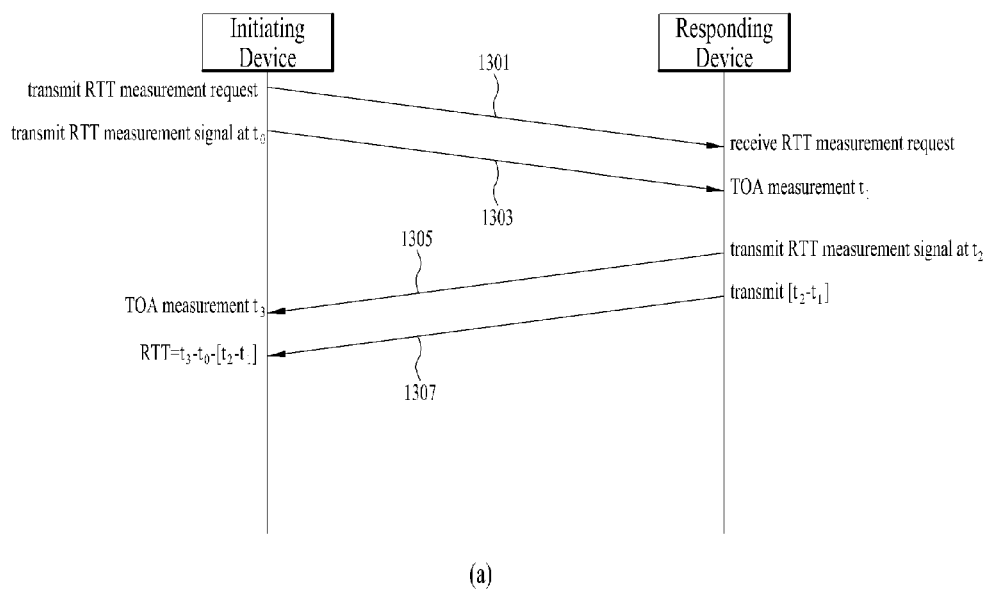
FIG. 11 is a diagram illustrating a multi-round trip time (multi-RTT) positioning method to which various embodiments are applicable.
Figure 11:
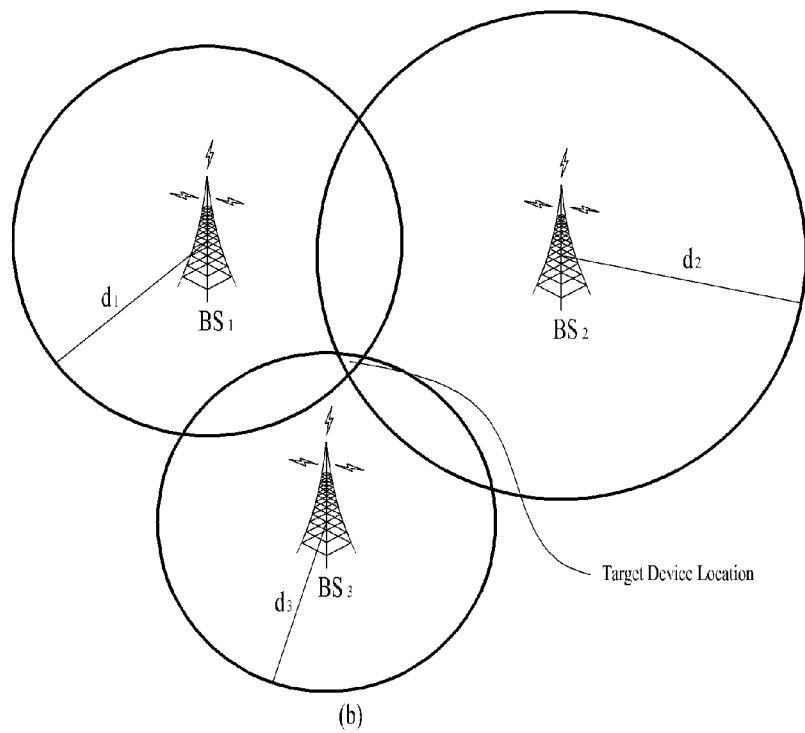

FIG. 11 is a diagram illustrating an exemplary multi-RTT positioning method to which various embodiments of the present disclosure are applicable.

Referring to FIG. 11(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1301 according to an exemplary embodiment, the initiating device may transmit an RTT measurement request, and the responding device may receive the RTT measurement request.

In operation 1303 according to an exemplary embodiment, the initiating device may transmit an RTT measurement signal at time t0, and the responding device may obtain TOA measurement $t_1$.

In operation 1305 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 8 below. The corresponding information may be transmitted and received by a separate signal or in the RTT measurement signal of operation 1305.

$$RTT = t_3 - t_0 - [t_2 - t_1] \quad \text{[Equation 8]}$$

Referring to FIG. 11(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 7 shows an exemplary SRS request field.

TABLE 7

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-Resource Set with higher layer parameter aperiodicSRS-ResourceTrigger set to 1 or an entry in aperiodicSRS-Resource TriggerList set to 1 SRS resource set(s) configured by SRS-PosResource Set with an entry in aperiodicSRS-Resource TriggerList set to 1 when triggered by DCI formats 0_1, 0_2, 1_1 and 1_2 | SRS resource set(s) configured with higher layer parameter usage in SRS-ResourceSet set to 'antennaSwitching' and resource Type in SRS-ResourceSet set to 'aperiodic' for a 1st set of serving cells configured by higher layers |
| 10 | SRS resource set(s) configured by SRS-ResourceSet with higher layer parameter aperiodicSRS-ResourceTrigger set to 2 or an entry in aperiodicSRS-Resource TriggerList set to 2 | SRS resource set(s) configured with higher layer parameter usage in SRS-ResourceSet set to 'antennaSwitching' and resource Type in SRS- |

TABLE 7-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 11 | SRS resource set(s) configured by SRS-PosResourceSet with an entry in aperiodicSRS-ResourceTriggerList set to 2 when triggered by DCI formats 0_1, 0_2, 1_1, and 1_2<br>SRS resource set(s) configured by SRS-ResourceSet with higher layer parameter aperiodicSRS-ResourceTrigger set to 3 or an entry in aperiodicSRS-ResourceTriggerList set to 3<br>SRS resource set(s) configured by SRS-PosResourceSet with an entry in aperiodicSRS-ResourceTriggerList set to 3 when triggered by DCI formats 0_1, 0_2, 1_1, and 1_2 | ResourceSet set to 'aperiodic' for a $2^{nd}$ set of serving cells configured by higher layers<br><br>SRS resource set(s) configured with higher layer parameter usage in SRS-ResourceSet set to 'antennaSwitching' and resource Type in SRS-ResourceSet set to 'aperiodic' for a $3^{rd}$ set of serving cells configured by higher layers |

In Table 7, srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
AOA (AoA): angle of arrival
Comb: a comb may refer to a method of mapping signals at regular intervals in the frequency domain. For example, comb 2 (comb-2 or 2-comb) may mean mapping the same specific RS to each RE spaced by two subcarriers. Comb 4 (comb-4 or 4-comb) may mean mapping the same specific RS to each RE spaced by four subcarriers.
CSI-RS channel state information reference signal
LMF: location management function
OTDOA (OTDoA): observed time difference of arrival
PRS: positioning reference signal
RAT: radio access technology
RS: reference signal
RTT: round trip time
RSRP: reference signal received power
RSRQ: reference signal received quality
RSTD: reference signal time difference/relative signal time difference
SRS: SRS is the abbreviation of Sounding Reference Signal. According to various embodiments, the SRS may be used for UL channel estimation based on multi-input multi-output (MIMO) and positioning measurement. In other words, according to various embodiments, the SRS may include a normal SRS and a positioning SRS. According to various embodiments, the positioning SRS may be understood as a UL RS configured and/or used for UE positioning. According to various embodiments, the normal SRS is different from the positioning SRS. Specifically, the normal SRS may be understood as a UL RS configured and/or used for UL channel estimation (additionally or alternatively, the normal SRS may be understood as a UL RS configured and/or used for UL channel estimation and positioning). According to various embodiments, the positioning SRS may also be referred to as SRS for positioning. In the description of various embodiments, the following terms: 'positioning SRS' and 'SRS for positioning' may be used interchangeably and understood to have the same meaning. According to various embodiments, the normal SRS may also be referred to as a legacy SRS, a MIMO SRS, an SRS for MIMO, or the like. In the description of various embodiments, the following terms: 'normal SRS', 'legacy SRS', 'MIMO SRS', and 'SRS for MIMO' may be used interchangeably and understood to have the same meaning. For example, the normal SRS and the positioning SRS may be separately configured/indicated. For example, the normal SRS and the positioning SRS may be configured/indicated by different IEs (information elements) of higher layers. For example, the normal SRS may be configured based on SRS-resource, and the positioning SRS may be configured based on SRS-PosResource.
SS: synchronization signal
SSB: synchronization signal block
SS/PBCH: synchronization signal/physical broadcast channel
TDOA (TDoA): timing difference of arrival
TRP: transmission and reception point (TP: transmission point)
posSIB: a posSIB may refer to a positioning system information block (SIB), which includes information related to positioning. For example, the posSIB may include assistance data for positioning. The assistance data may be included in a subfield (e.g., SIBpos) in the posSIB. The assistance data may include a PRS ID for identifying a DL PRS resource. The assistance data may be configured by the server/LMF, and the assistance data may be transmitted to the UE through the BS in the posSIB.
ceil (x): ⌈x⌉ denotes a ceiling operation or function. Ceil (x) may mean the smallest integer more than or equal to real number x and/or an integer greater than or equal to real number x.
floor (x): ⌊x⌋ denotes a floor operation or function. Floor (x) may mean the largest integer less than or equal to real number x and/or an integer less than or equal to real number x.

In the description of various embodiments of the present disclosure, the term BS is to be understood as an umbrella term including a remote radio head (RRH), eNB, gNB, TP, reception point (RP), relay, etc.

In the description of various embodiments of the present disclosure, when it is said that something is more than/more than or equal to A, it may be interpreted to mean that A is more than or equal to/more than A.

In the description of various embodiments of the present disclosure, when it is said that something is less than/less than or equal to B, it may be interpreted to mean that the thing is less than or equal to/less than B.

In the description of various embodiments, a cell/BS/TRP ID may be understood as a dl-PRS-ID. Table 8 below shows the definition of the dl-PRS-ID.

TABLE 8

---

-                   DL-PRS-ID-Info
The IE DL-PRS-ID-Info provides the IDs of the reference TRPs' DL-PRS Resources.
-- ASN1START
DL-PRS-ID-Info-r16 ::= SEQUENCE {
    dl-PRS-ID-r16                               INTEGER (0..255),
    nr-DL-PRS-ResourceID-List-r16     SEQUENCE (SIZE {1..nrMaxResourceIDs-r16)) OF
    NR-DL-PRS-ResourceID-r16           OPTIONAL,
    nr-DL-PRS-ResourceID-List-r16     NR-DL-PRS-ResourceSetID-r16
    OPTIONAL
}
-- ASN1STOP

--- dl-PRS-ID
This field is used along with a DL-PRS Resource Set ID and a DL-PRS Resources ID to uniquely identify a DL-
PRS Resource. This ID can be associated with multiple DL-PRS Resource Sets associated with a single TRP.
Each TRP should only be associated with one such ID.

Table 9 below shows an exemplary PRS reception procedure to which various embodiments are applicable.

TABLE 9

---

5.1.6.5    PRS reception procedure

---

The UE can be configured with one or more DL PRS resource set configuration(s) as indicated by the higher
layer parameters NR-DL-PRS-ResourceSet and NR-DL-PRS-Resource as defined by Clause 6.4.3 [17, TS
37.355]. Each DL PRS resource set consists of K≥1 DL PRS resource(s) where each has an associated
spatial transmission filter. The UE can be configured with one or more DL PRS positioning frequency layer
configuration(s) as indicated by the higher layer parameter NR-DL-PRS-Positioning FrequencyLayer. A DL
PRS positioning frequency layer is defined as a collection of DL PRS resource sets which have common
parameters configured by NR-DL-PRS-PositioningFrequencyLayer.
The UE assumes that the following parameters for each DL PRS resource(s) are configured via higher layer
parameters NR-DL-PRS-PositioningFrequencyLayer, NR-DL-PRS-ResourceSet and NR-DL-PRS-
Resource.
A positioning frequency layer is configured by NR-DL-PRS-PositioningFrequencyLayer. consists of one or
more DL PRS resource sets and it is defined by:
- dl-PRS-SubcarrierSpacing defines the subcarrier spacing for the DL PRS resource. All DL PRS
  resources and DL PRS resource sets in the same DL PRS positioning frequency layer have the same
  value of dl-PRS-SubcarrierSpacing. The supported values of dl-PRS-SubcarrierSpacing are given in
  Table 4.2-1 of [4, TS38.211].
- dl-PRS-CyclicPrefix defines the cycle prefix for the DL PRS resource. All DL PRS Resources and
  DL PRS Resource sets in the same DL PRS positioning frequency layer have the same value of dl-
  PRS-CyclicPrefix. The supported values of dl-PRS-CyclicPrefix are given in Table 4.2-1 of [4.
  TS38.211].
- dl-PRS-PointA defines the absolute frequency of the reference resource block. Is lowest subcarrier is
  also known as Point A. All DL PRS resources belonging to the same DL PRS resource set have
  common Point A and all DL PRS resources sets belonging to the same DL PRS positioning frequency
  layer have a common Point A.
The UE expects that it will be configured with dl-PRS-ID each of which is defined such that it is associated
with multiple DL PRS resource sets. The UE expects that one of these dl-PRS-ID along with a nr-DI-PRS-
ResourceSetID and a nr-DL-PRS-ResourceID-r16 can be used to uniquely identify a DL PRS resource.
A DL PRS resource set is configured by NR-DL-PRS-ResourceSet, consists of one or more DL PRS
resources and it is defined by:
- nr-DL-PRS-ResourceSetID defines the identity of the DL PRS resource set configuration.
- dl-PRS-Periodicity-and-ResourceSetSlotOffset defines the DL PRS resource periodicity and takes
  values $T_{per}^{PRS} \in 2^\mu \{4, 5, 8, 10, 16, 20, 32, 40, 64, 80, 160, 320, 640, 1280, 2560, 5120, 10240\}$ slots.
  where µ = 0, 1, 2, 3 for dl-PRS-SubcarrierSpacing=15, 30, 60 and 120 KHz respectively and the slot
  offset for DL-PRS resource set with respect to SFN0 slot 0. All the DL PRS resources within one DL
  PRS resource set are configured with the same DL PRS resource periodicity.
- dl-PRS-ResourceRepetitionFactor defines how many times each DL-PRS resource is repeated for a
  single instance of the DL-PRS resource set and takes values $T_{rep}^{PRS} \in \{1,2,4,6,8,16,32\}$. All the DL
  PRS resources within one resource set have the same resource repetition factor.
- dl-PRS-ResourceTimeGap defines the offset in number of slots between two repeated instances of a
  DL PRS resource with the same nr-DL-PRS-ResourceId within a single instance of the DL PRS
  resource set. The UE only expects to be configured with dl-PRS-ResourceTimeGap if dl-PRS-
  Resource RepetitionFactor is configured with value greater than 1. The time duration spanned by one
  instance of a nr-DL-PRS-ResourceSet is not expected to exceed the configured value of DL PRS
  periodicity. All the DL PRS resources within one resource set have the same value of dl-PRS-
  ResourceTimeGap.
- dl-PRS-MutingOption1 and dl-PRS-MutingOption2 define the time locations where the DL PRS
  resource is expected to not be transmitted for a DL PRS resource set. If dl-PRS-MutingOption1 is
  configured, each bit in the bitmap of dl-PRS-MutingOption1 corresponds to a configurable number
  provided by higher layer parameter dl-prs-MutingBitRepetitionFactor of consecutive instances of a
  DL PRS resource set where all the DL PRS resources within the set are muted for the instance that is
  indicated to be muted. The length of the hitman can be (2, 4, 6, 8, 16, 32; bits. It dl-PRS-
  MutingOption2 is configured cach hit in the bitmap of dl-PRS-MutingOption2 corresponds to a single
  repetition index for each of the DL PRS resources within each instance of a nr-DL-PRS- ResourceSet TABLE 9-continued 5.1.6.5 PRS reception procedure and the length of the bitmap is equal to the values of dl-PRS-ResourceRepetitionFactor. Both dl-PRS-MutingOption1 and dl-PRS-MutingOption2 may be configured at the same time in which case the logical AND operation is applied to the bit maps as described in Clause 7.4.1.7.4 of [4, TS 38.211].
- NR-DL-PRS-SFN0-Offset defines the time offset of the SFN0 slot 0 for the transmitting cell with respect to SFN0 slot 0 of reference cell.
- dl-PRS-ResourceList determines the DL PRS resources that are contained within one DL PRS resource set.
- dl-PRS-CombSizeN defines the comb size of a DL PRS resource where the allowable values are given in Clause 7.4.1.7.3 of [TS38.211]. All DL PRS resource sets belonging to the same positioning frequency layer have the same value of dl-PKS-CombSizeN.
- dl-PRS-ResourceBandwidth defines the number of resource blocks configured for DL PRS transmission. The parameter has a granularity of 4 PRBs with a minimum of 24 PRBs and a maximum of 272 PRBs. All DL PRS resources sets within a positioning frequency layer have the same value of dl-PRS-ResourceBandwidth.
- dl-PRS-StartPRB defines the starting PRB index of the DL PRS resource with respect to reference Point A. where reference Point A is given by the higher-layer parameter dl-PRS-PointA. The starting PRB index has a granularity of one PRB with a minimum value of 0 and a maximum value of 2176 PRBs. All DL PRS resource sets belonging to the same positioning frequency layer have the same value of dl-PRS-StartPRB.
- dl-PRS-NumSymbols defines the number of symbols of the DL PRS resource within a slot where the allowable values are given in Clause 7 4.1.7.3 of [4, TS38.211].

A DL PRS resource is defined by:
- nr-DL-PRS-ResourceID determines the DL PRS resource configuration identity. All DL PRS resource IDs are locally defined within a DL PRS resource set.
- dl-PRS-SequenceID is used to initialize $c_{init}$ value used in pseudo random generator as described in Clause 7.4.1.7.2 [4, TS 38.211] for generation of DL PRS sequence for a given DL PRS resource.
- dl-PRS-CombSizeN-AndReOffset defines the starting RE offset of the first symbol within a DL PRS resource in frequency. The relative RE offsets of the remaining symbols within a DL PRS resource are defined based on the initial offset and the rule described in Clause 7.4.1.7.3 of [4, TS 38.211].
- dl-PRS-ResourceSlotOffset determines the starting slot of the DL PRS resource with respect to corresponding DL PRS resource set slot offset.
- dl-PRS-ResourceSymbol Offset determines the starting symbol of a slot configured with the DL PRS resource.
- dl-PRS-QCL-Info defines any quasi co-location information of the DL PRS resource with other reference signals, The DL PRS may be configured with QCL 'typeD' with a DL PRS from a serving cell or a non-serving cell, or with rs-Type set to 'typeC', 'typeD', or 'typeC-plus-typeD' with a SS/PBCH Block from a serving of non-serving cell.

The UE assumes constant EPRE is used for all REs of a given DL PRS resource.
The UE may be indicated by the network that DL PRS resource(s) can be used as the reference for the DL RSTD, DL PRS-RSRP, and UE Rx-Tx time difference measurements in a higher layer parameter nr-DL-PRS-ReferenceInfo. The reference indicated by the network to the UE can also be used by the UE to determine how to apply higher layer parameters nr-DL-PRS-ExpectedRSTD and nr-DL-PRS-ExpectedRSTD-Uncerainty. The UE expects the reference to be indicated whenever it is expected to receive the DL PRS. This reference provided by nr-DL-PRS-ReferenceInfo may include a dl-PRS-ID, a DL-PRS resource set ID, and optionally a single DL PRS resource ID or a list of DL PRS resource IDs [17, TS 37.355]. The UE may use different DL PRS resources of a different DL PRS resource set to determine the reference for the RSTD measurement as long as the condition that the DL PRS resources used belong to a single DL PRS resource set is met. If the UE chooses to use a different reference than indicated by the network, then it is expected to report the dl-PRS-ID, the DL PRS resource ID(s) or the DL PRS resource set ID used to determine the reference.
The UE may be configured to report quality metrics NR-TimingQuality corresponding to the DL RSTD and UE Rx-Tx the difference measurements which include the following fields:
- timingQualityValue which provides the best estimate of the uncertainty of the measurement
- timingQualityResolution which specifies the resolution levels used in the timingQualityValue field.

The UE expects to be configured with higher layer parameter nr-DL-PRS-ExpectedRSTD, which defines the time difference with respect to the received DL subframe timing the UE is expected to receive DL PRS. and nr-DL-PRS-ExpectedRSTD-Uncertainty, which defines a search window around the nr-DL-PRS-ExpectedRSTD.
For DL UE positioning measurement reporting in higher layer parameters NR-DL-TDOA-SignalMeasurementInformation of NR-Multi-RTT-SignalMeasurementInformation the UE can be configured to report the DL PRS resource ID(s) or the DL PRS resource set ID(s) associated with the DL PRS resource(s) or the DL PRS resource set(s) which are used in determining the UE measurements DL RSTD, UE Rx-Tx time difference.
For the DL RSTD, DL PRS-RSRP, and UE Rx-Tx time difference measurements the UE can report an associated higher layer parameter nr-TimeStamp. The nr-TimeStamp can include the dl-PRS-ID, the SFN and the slot number for a subcarrier spacing. These values correspond to the reference which is provided by nr-DL-PRS-ReferenceInfo.
The UE is expected to measure the DL PRS resource outside the active DL BWP or with a numerology different from the numerology of the active DL BWP if the measurement is made during a configured measurement gap. When the UE is expected to measure the DL PRS resource outside the active DL BWP it may request a measurement gap via higher layer parameter NR-PRS-MeasurementInfoList [12, TS 38.331].
The UE assumes that the DL PRS from the serving cell is not mapped to any symbol that contains SS/PBCH block from the serving cell. If the time frequency location of the SS/PBCH block transmissions from non-serving cells are provided to the UE then the UE also assumes that the DL PRS from a non-serving cell is not mapped to any symbol that contains the SS/PBCH block of the same non-serving cell.
The UE may be configured to measure and report, subject to UE capability, up to 4 DL RSTD measurements per pair of dl-PRS-ID with each measurement between a different pair of DL PRS resources or DL PRS TABLE 9-continued 5.1.6.5 PRS reception procedure resource sets within the DL PRS configured for those dl-PRS-ID. The up to 4 measurements being performed on the same pair of dl-PRS-ID and all DL RSTD measurements in the same report use a single reference timing.
The UE may be configured to measure and report subject to UE capability, up to 8 DL PRS-RSRP measurements on different DL PRS resources associated with the same dl-PRS-ID. When the UE reports DL PRS-RSRP measurements from one DL PRS resource set, the UE may indicate which DL PRS-RSRP measurements associated with the same higher layer parameter nr-DL-PRS-RxBeamindex [17, TS 37.355] have been performed using the same spatial domain filter for reception if for each nr-DL-PRS-RxBeamIndex reported there are at least 2 DL PRS-RSRP measurements associated with it within the DL PRS resource set.
The UE may be configured to measure and report, subject to UE capability, up to 4 UE Rx-Tx time difference measurements corresponding to a single configured SRS resource or resource set for positioning. Each measurement corresponds to a single received DL PRS resource of resource set which can be in different positioning frequency layers.
The UE may be configured to measure and report, subject to UE capability, the timing and the quality metrics of op to 2 additional detected paths that are associated with each RSTD or UE Rx - Tx time difference. The timing of each additional path is reported relative to the path timing used for determining nr-RSTD os nr-UE-RxTxTimeDiff.
If the UE is configured with DL-PRS-QCL-Info and the QCL relation is between two DL PRS resources, then the UE assumes those DL PRS resources are associated with the same dl-PRS-ID. If DL-PRS-QCL-Info is configured to the UE with qel-Type set to 'type-D' with a source DL-PRS-Resource then the nr-DL-PRS-ResourceSetId and the nr-DL-PRS-ResourceId of the source DL PRS resource are expected to be indicated to the UE.
UE is not expected to process DL PRS without configuration of measurement gap.

Unless specified stated otherwise, (all) the operations of the UE according to various embodiments may be configured/indicated by the BS/location server/network. Additionally/alternatively, the operations may be defined as default operations executed without explicit/implicit configurations/instructions.

Various embodiments may be related to reporting, by the UE, the DL PRS processing capability of the UE. For example, various embodiments may be related to a signaling method for the UE to inform the network (e.g., BS/location server/LMF) of the DL PRS processing capability of the UE.

Various embodiments may be related to priorities between configured PRSs. For example, when the configured PRSs exceed the capability of the UE, a priority rule for the UE to select and process a PRS may need to be determined/defined. For example, according to various embodiments, a reference configuration configured to obtain/determine a reference timing may have the highest priority, and priorities may be defined/determined/configured in descending order of cell/BS/TRP IDs, in descending order of PRS resource IDs, and/or in descending order of PRS resource set IDs. However, various embodiments are not limited thereto, and other embodiments may be provided.

Figure 12:
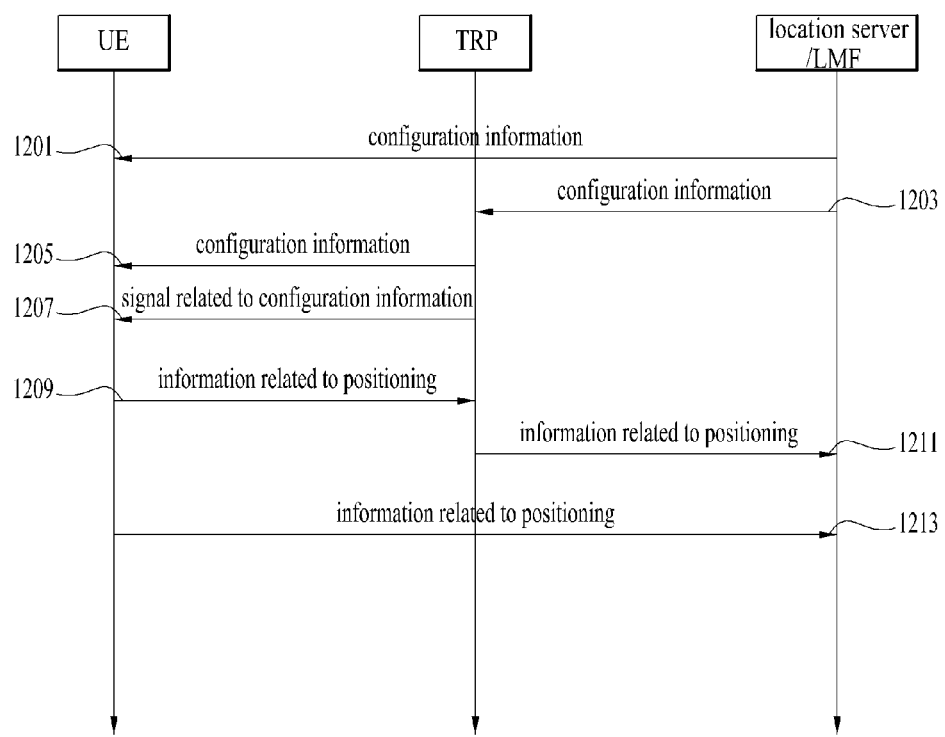
FIG. 12 is a simplified diagram illustrating a method of operating a UE, a transmission and reception point (TRP), a location server, and/or a location management function (LMF) according to various embodiments.

FIG. 12 is a diagram schematically illustrating a method of operating a UE, a TRP, a location server, and/or an LMF according to various embodiments.

Referring to FIG. 12, in operation 1201 according to various embodiments, the location server and/or LMF may transmit configuration information to the UE, and the UE may receive the configuration information.

In operation 1203 according to various embodiments, the location server and/or LMF may transmit reference configuration information to the TRP, and the TRP may receive the reference configuration information. In operation 1205 according to various embodiments, the TRP may forward the reference configuration information to the UE, and the UE may receive the reference configuration information. In this case, operation 1201 according to various embodiments may be omitted.

On the contrary, operations 1203 and 1205 according to various embodiments may be omitted. In this case, operation 1201 according to various embodiments may be performed.

That is, operations 1201 according to various embodiments and operations 1203 and 1205 according to various embodiments may be exclusive.

In operation 1207 according to various embodiments, the TRP may transmit a signal related to the configuration information to the UE, and the UE may receive the signal related to the configuration information. For example, the signal related to the configuration information may be a signal for positioning of the UE.

In operation 1209 according to various embodiments, the UE may transmit a signal related to positioning to the TRP, and the TRP may receive the signal related to positioning. In operation 1211 according to various embodiments, the TRP may forward the signal related to positioning to the location server and/or LMF, and the location server and/or LMF may receive the signal related to positioning.

In operation 1213 according to various embodiments, the UE may transmit the signal related to positioning to the location server and/or LMF, and the location server and/or the LMF may receive the signal related to positioning. In this case, operations 1209 and 1211 according to various embodiments may be omitted.

On the contrary, operation 1213 according to various embodiments may be omitted. In this case, operations 1211 and 1213 according to various embodiments may be performed.

That is, operations 1209 and 1211 according to various embodiments and operations 1213 according to various embodiments may be exclusive.

According to various embodiments, the signal related to positioning may be obtained based on the configuration information and/or the signal related to the configuration information.

Figure 13:
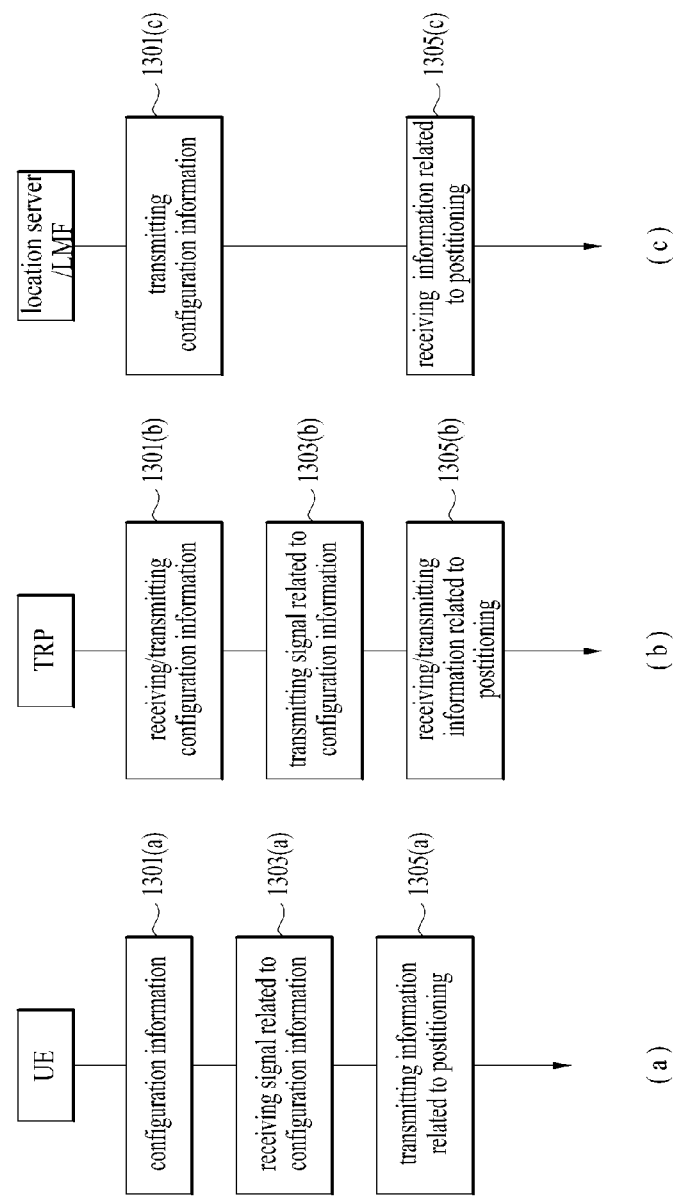
FIG. 13 is a simplified diagram illustrating a method of operating a UE, a TRP, a location server, and/or an LMF according to various embodiments.

FIG. 13 is a diagram schematically illustrating a method of operating a UE, a TRP, a location server, and/or an LMF according to various embodiments.

Referring to FIG. 13($a$), in operation 1301($a$) according to various embodiments, the UE may receive configuration information.

In operation 1303($a$) according to various embodiments, the UE may receive a signal related to configuration information.

In operation 1305(a) according to various embodiments, the UE may transmit information related to positioning.

Referring to FIG. 13(b), in operation 1301(b) according to various embodiments, the TRP may receive configuration information from the location server and/or LMF and forward the configuration information to the UE.

In operation 1303(b) according to various embodiments, the TRP may transmit a signal related to the configuration information.

In operation 1305(b) according to various embodiments, the TRP may receive information related to positioning and forward the information related to positioning to the location server and/or LMF.

Referring to FIG. 13(c), in operation 1301(c) according to various embodiments, the location server and/or LMF may transmit configuration information.

In operation 1305(c) according to various embodiments, the location server and/or LMF may receive information related to positioning.

For example, in the following description of various embodiments, the above-described configuration information may be understood to be related to a reference configuration (information), a standard configuration (information), a consultation configuration (information), and/or one or more pieces of information transmitted/configured by the location server, LMF, and/or TRP to the UE. Additionally/alternatively, the configuration information may be interpreted to mean the corresponding reference configuration (information), standard configuration (information), consultation configuration (information), and/or one or more pieces of information transmitted/configured by the location server, LMF, and/or TRP to the UE.

For example, in the following description of various embodiments, the above-described signal related to positioning may be understood as a signal related to one or more pieces of information reported by the UE. Additionally/alternatively, the signal related to positioning may be understood as a signal including one or more pieces of information reported by the UE.

For example, in the following description of various embodiments, a BS, a gNB, a cell, etc. may be replaced with a TRP, a TP, or any device that plays the same role.

For example, in the following description of various embodiments, a location server may be replaced with an LMF or any device that plays the same role.

Particular operations, functions, terms, etc. in the operations according to each exemplary embodiment may be performed and explained based on various embodiments to be described later. On the other hand, the operations according to each exemplary embodiment are merely exemplary, and one or more of the above-described operations may be omitted depending on the details of each embodiment.

Hereinafter, various embodiments will be described in detail. It may be understood by those of ordinary skill in the art that the various embodiments described below may be combined in whole or in part to implement other embodiments unless mutually exclusive.

According to various embodiments, a UE capability report for PRS processing may be considered. For example, at least one of the following may be considered for the DL PRS processing capability of the UE.

The UE DL PRS processing capability may be reported for the maximum DL PRS bandwidth (in units of MHz) which is supported and/or reported by the UE. For example, the value of the maximum DL PRS bandwidth for reporting of the UE DL PRS processing capability may be defined/determined/configured in advance and/or configured/indicated explicitly/implicitly.

For example, the UE may be expected not to support a DL PRS bandwidth that exceeds the reported DL PRS bandwidth value.

For example, the UE DL PRS processing capability may be scaled in inverse proportion to the DL PRS processing bandwidth, and vice versa.

For example, the DL PRS processing capability may be signaled for each band.

For example, the UE DL PRS processing capability may be independent of (agnostic to) the (SCS) configured for a DL PRS, and vice versa.

For example, the UE DL PRS processing capability may be defined for a single positioning frequency layer.

For example, the UE DL PRS processing capability may be independent of (agnostic to) a DL PRS comb factor configuration.

For example, regarding multiple frequency layers, for a UE supporting multiple positioning frequency layers, the UE may be expected to process one frequency layer at a time. If the UE reports that the UE supports (N1, N2, T) for one frequency layer and supports K frequency layers, the corresponding UE may support a DL PRS processing capability of (N1, N2, K*T) in all K frequency layers.

For example, N1 may correspond to the number of PRS symbols in millisecond (msec or ms) that the UE is capable of processing within T msec (T ms).

For example, N2 may be the number of PRS resources that the UE is capable of processing within T msec.

Unless specified otherwise, the above-described definitions of N1, N2, and T may be equally applied in the following description of various embodiments.

For example, the DL PRS processing capability of the UE may be reported for each band. Various embodiments may be related to specific methods for the PRS processing capability (and/or reporting thereof). When simultaneous processing in different radio access technologies (RATs) (e.g., LTE and NR) is supported, various embodiments may be related to the definition of the PRS processing capability.

NR PRS Processing Capability (in Consideration of Beam Related Issues)

According to various embodiments, the UE may report information about a time N ms capable of processing a PRS for a specific time (e.g., T ms) to the BS/location server/LMF. For example, the UE may report (N, T).

Additionally and/or separately, according to various embodiments, the UE may report the number of PRS resources N2 capable of being processed for N ms. For example, the UE may report (N1, N2, T).

Additionally and/or separately, it may be necessary to report to the network how many PRS resources the UE is capable of receiving simultaneously in a specific symbol. Even if the UE is capable of processing N2 (>0) PRS resources for time N (e.g., N ms), the information (i.e., the information that the UE is capable of processing N2 PRS resources for time N) may not mean that the UE is capable of processing the N2 PRS resources in the specific symbol and/or in several symbols. For example, the number of reception beams on which the UE is capable of simultaneously receiving PRS resources in different directions may be smaller than N2. That is, even if UE capability signaling of (N, T) and/or (N1, N2, T) is defined and if the UE reports the UE capability, the information (signaling) may not be sufficient for the BS/location server/LMF to configure PRS resources for the UE.

For example, if a PRS resource has one frequency RE pattern set to a comb of 4, a total of four PRS REs may be distributed one by one over four symbols. These PRS resources may be transmitted in different (physical) cells/BSs/TRPs. The UE may not configure/use an appropriate reception beam for each PRS resource, and the measurement quality for a specific PRS resource may be remarkably degraded below a certain level. Thus, it may be necessary for the BS/location server/LMF to configure/indicate PRS resources to the UE and/or configure/instruct the UE to report PRS resource measurements in consideration of these points (e.g., UE reception beam, etc.)

Proposal #1

According to various embodiments, the UE may transmit at least one of the following information to the BS/location server/LMF as information on the DL PRS processing capability of the UE. According to various embodiments, at least one of the following options may be considered to report the DL PRS processing capability of the UE.

Alt. 1

Reporting of (N, N2, N3, T) or (N, N3, T). In this case, information on N3 may be reported additionally and/or separately. For example, N3 may be reported separately, and/or (N1, N2, N3, T) and/or (N, N3, T) may be reported. Additionally/alternatively, at least one parameter other than N3 may also be reported separately. According to various embodiments, N3 may be defined/interpreted/used according to at least one options to be described in Alt. 2.

Alt. 2

Reporting of (N, N2, N3, T, PRS_BW) or (N, N3, T, PRS_BW). In this case, information on N3 and/or PRS_BW may be reported additionally and/or separately. For example, N3 and/or PRS_BW may be reported separately, and/or (N1, N2, N3, T, PRS_BW) and/or (N, N3, T, PRS_BW) may be reported. Additionally/alternatively, at least one parameter other than N3 and/or PRS_BW may also be reported separately.

The definition of each parameter in Alt. 1 and/or Alt. 2 according to various embodiments may will be described. For example, N2 may mean the number of PRS resources that the UE is capable of processing for time unit N (e.g., N ms) (N2: # of PRS resources that UE is capable of processing for time unit N (e.g., N ms)).

In Alt. 1 and/or Alt. 2 according to various embodiments, N3 may be defined/interpreted/used according to at least one of the following options. Unless stated otherwise, the definition of N3 to be described later may be generally applied in the description of various embodiments.

Option #1

The number of PRS resources that the UE is capable of simultaneously receiving in a specific 01-DM symbol.

Option #2

The number of different QCL type-D configurations that the UE is capable of simultaneously using in a specific 01-DM symbol. That is, the definition of N3 may be understood as the number of DL PRS resources having different QCL type-D configurations. For example, M (>N2) PRS resources may be divided into N2 groups/sets, and the same QCL type-D may be configured/indicated for PRS resources belonging to the same group/set.

Option #3

The number of (physical) cells/BSs/TRPs that simultaneously transmit PRS resources in a specific OFDM symbol.

Option #4

The number of reception panels that the UE is capable of using to simultaneously receive DL PRS(s) and/or the number of reception antenna groups that the UE is capable of using to simultaneously receive DL PRS(s).

In the description of various embodiments, the term 'panel' may be variously interpreted as follows: a group of UE antenna elements, a group of UE antenna ports, and/or a group of UE logical antennas. For example, to determine which physical/logical antennas and/or which antenna ports are bundled and mapped to one panel, the location/distance/correlation/RF (radio frequency) configuration/antenna (port) virtualization between antennas may be considered in various ways. Such a mapping process may vary depending on the implementation of the UE.

Additionally/alternatively, in the description of various embodiments, the term 'panel' may mean a plurality of panels and/or a group of panels (that is, panels have a similarity in terms of a particular characteristic (e.g., a difference between values related to the particular characteristic is within a prescribed range and/or less than or equal to a prescribed threshold)).

PRS_BW: In Alt. 2 according to various embodiments, PRS_BW may mean a specific PRS bandwidth and/or a maximum PRS bandwidth that the UE is capable of processing. For example, the UE may report the DL PRS processing capability for a specific PRS bandwidth and/or a maximum PRS bandwidth to the BS/location server/LMF as described in Alt. 2. Unless stated otherwise, the definition of PRS_BW may be generally applied in the description of various embodiments.

According to various embodiments, reporting of N3 (and/or PRS_BW) may be performed as one tuple (for example, N3 may be reported together with (N, N2, T) and/or (N, T) as one tuple). Additionally/alternatively, reporting of N3 may be performed independently and separately (for example, N3 may be reported separately from (N, N2, T) and/or (N, T)).

According to various embodiments, UE capability reporting may be performed for each band and/or each frequency layer. Additionally/alternatively, according to various embodiments, the UE may report one UE capability for each specific frequency band combination and/or each specific frequency layer combination (according to the above-described embodiments) by considering that the PRS is capable of being transmitted simultaneously in multiple frequency layers and/or multiple bands.

Additionally and/or separately, in Alt. 1 and/or Alt. 2 according to various embodiments, the UE may report whether the UE has a measurement gap configured therefor. For example, when the measurement gap is configured, the UE may report to the network that the UE is capable of using all spatial resources (and/or all reception beams) available to the UE for PRS reception (without securing beams to be used for data reception).

According to various embodiments, in addition to and/or separately from information that the UE is capable of processing for the PRS for a specific time, the UE may provide the BS/location server/LMF with information on the number of beams that the UE is capable of simultaneously receiving and/or information on the number of cells/BSs/TRPs from which the UE is capable of simultaneously receiving the PRS (and/or information on at least one of the options for definition/interpretation/use of N3 described above) as the DL PRS processing capability of the UE.

In Alt. 1 and/or Alt. 2 according to various embodiments, the information reported by the UE may be provided as one tuple, and/or each parameter may be reported separately. Additionally/alternatively, a group/set of specific parameters may be reported. However, this is only an example, and the information reported by the UE according to various embodiments may not be limited in a particular way. This may be equally applied to other examples according to various embodiments as well as the examples described in this section.

Proposal #2 (Simultaneous Processing of LTE PRS+NR PRS)

According to various embodiments, the UE may report the capability of simultaneous processing for different RATs to the BS/location server/LMF. For example, in order for the UE to inform the BS/location server/LMF of the capability of simultaneous processing for an LTE PRS and a NR PRS, at least one of the following options may be considered for UE capability reporting.

Reporting of (N, N2, N3, α, T), (N, N3, α, LTE_PRS_BW, NR_PRS_BW), or (N, N3, a, LTE_PRS_BW+NR_PRS_BW). In this case, information on a may be reported additionally and/or separately. For example, a may be reported separately, and/or (N, N2, N3, α, T), (N, N3, α, LTE_PRS_BW, NR_PRS_BW), and/or (N, N3, α, LTE_PRS_BW+NR_PRS_BW) may be reported. Additionally/alternatively, at least one parameter other than α may also be reported separately. For example, LTE_PRS_BW and NR_PRS_BW may be reported separately, and/or the sum thereof may be reported.

Reporting of (N, N3, α, T), (N, N3, α, LTE_PRS_BW, NR_PRS_BW), or (N, N3, α, LTE_PRS_BW+NR_PRS_BW). In this case, information on a may be reported additionally and/or separately. For example, a may be reported separately, and/or (N, N3, α, T), (N, N3, α, LTE_PRS_BW, NR_PRS_BW), and/or (N, N3, α, LTE_PRS_BW+NR_PRS_BW) may be reported. Additionally/alternatively, at least one parameter other than a may also be reported separately. For example, LTE_PRS_BW and NR_PRS_BW may be reported separately, and/or the sum thereof be reported.

In the description of various embodiments, LTE_PRS_BW and NR_PRS_BW may be defined as follows. Unless stated otherwise, the definitions of LTE_PRS_BW and NR_PRS_BW to be described later may be generally applied in the description of various embodiments.

LTE_PRS_BW: A maximum bandwidth for an LTE PRS supported by the UE (and/or a (maximum) bandwidth for the LTE PRS).

NR_PRS_BW: A bandwidth for a specific NR PRS supported by the UE and/or a maximum bandwidth for an NR PRS supported by the UE.

According to various embodiments, the UE may report to the network that the time for simultaneous processing of the NR PRS and LTE PRS for time unit T (e.g., T ms) is N×α (ms). According to various embodiments, a may be a scaling factor for N.

For example, when only the NR PRS is processed, α=1.

For example, when the LTE PRS and NR PRS are simultaneously processed, the amount of buffering and/or calculation may increase compared to when only the NR PRS is processed, so that α<1 may be considered.

For example, α≥0.

For example, when only the NR PRS is processed, a total of N2 NR PRS resources may be processed. However, when simultaneous processing of the LTE PRS and NR PRS is performed, the UE may report to the network that the number of NR PRS resources that the UE is capable of processing for time T is $\lfloor α×N2 \rfloor$ and/or $\lceil α×N2 \rceil$.

Additionally/alternatively, according to various embodiments, the following may be considered as another option.

Reporting of (N, N2, N3, α, β, T). In this case, information on α/β (α and/or β) may be reported additionally and/or separately. For example, α/β may be reported separately, and/or (N, N2, N3, α, β, T) may be reported. Additionally/alternatively, at least one parameter other than α/β may also be reported separately.

In various embodiments, α/β may be defined as follows. Unless stated otherwise, the definitions of α and β to be described later may be generally applied in the description of various embodiments.

α: scaling factor for N
β: scaling factor for N2

For example, in this case, the UE may report to the network that the number of NR PRS resources that the UE is capable of processing for time T is $\lfloor β×N2 \rfloor$ and/or $\lceil β×N2 \rceil$.

Proposal #3 (NR PRS Processing for Multiple Frequency Layers/Bands (CA/DC))

According to various embodiments, to allow the UE to inform the BS/location server/LMF of the simultaneous DL PRS processing capability for K different frequency layers and/or K different frequency bands, at least one of the following options may be considered for UE capability reporting. For example, a carrier aggregation (CA) situation and/or a dual connectivity (DC) situation may be considered, but the present disclosure is not limited thereto.

Option #1

Reporting of (N, N3, α, K, T) or (N, N3, α, K, T, NR_PRS_BW). In this case, information on a may be reported additionally and/or separately. For example, a may be reported separately, and/or (N, N3, α, K, T) and/or (N, N3, α, K, T, NR_PRS_BW) may be reported. Additionally/alternatively, at least one parameter other than a may also be reported separately.

Option #2

Reporting of (N, N2, N3, α, K, T) or (N, N2, N3, α, K, T, NR_PRS_BW). In this case, information on α may be reported additionally and/or separately. For example, α may be reported separately, and/or (N, N2, N3, α, K, T) and/or (N, N2, N3, α, K, T, NR_PRS_BW) may be reported. Additionally/alternatively, at least one parameter other than a may also be reported separately.

Option #3

Reporting of (N, N2, N3, α, β, K, T) or (N, N2, N3, α, β, K, T, NR_PRS_BW). In this case, information on α/β (α and/or β) may be reported additionally and/or separately. For example, α/β may be reported separately, and/or (N, N2, N3, α, β, K, T) and/or (N, N2, N3, α, β, K, T, NR_PRS_BW) may be reported. Additionally/alternatively, at least one parameter other than α/β may also be reported separately.

In Option #1/#2/#3 according to various embodiments, it may be understood that when the PRS is transmitted in a single frequency layer and/or a single frequency band, the UE reports to the network that the PRS processing capability is (N, N3, T) (i.e., alpha=1) and the capability for DL PRS(s) transmitted in K frequency layers and/or K frequency bands is time N×α (e.g., N×α ms) for time T (e.g., T ms).

In Option #1/#2/#3 according to various embodiments, it may be understood that the UE informs the network that the number of reception beams that the UE is capable of simultaneously using in a specific symbol is N3.

In Option #2 according to various embodiments, it may be understood that the UE reports to the network that the total number of NR PRS resources that the UE is capable of processing for time T is $\lfloor \alpha \times N2 \rfloor$ and/or $\lceil \alpha \times N2 \rceil$.

In Option #3 according to various embodiments, it may be understood that the UE reports to the network that the total number of NR PRS resources that the UE is capable of processing for time T is $\lfloor \beta \times N2 \rfloor$ and/or $\lceil \beta \times N2 \rceil$.

Since the DL PRS processing capability of the UE may vary for each frequency band (and/or each frequency layer), it may be more accurate to report capabilities for PRSs to be transmitted simultaneously in multiple bands (and/or multiple layers) based on a frequency band combination (and/or frequency layer combination). However, reporting capabilities for multiple frequency band combinations (and/or multiple frequency layer combinations) may result in excessive signaling overhead. According to various embodiments, such a problem may be solved.

Proposal #4 (Buffering Capability+Processing Capability+RX Beam)

According to various embodiments, the UE may report a PRS buffering capability and a PRS processing capability separately.

Additionally and/or separately, according to various embodiments, the UE may report the maximum number of beams available at a specific time in order for the UE to receive the PRS in a specific symbol.

For example, the UE may report the number of PRS resources, PRS resource sets, and/or cells/BSs/TRPs that the UE is capable of simultaneously receiving together.

For example, the UE may report the buffering capability, the processing capability, and/or the number of different source RS s of QCL type-D that the UE is capable of simultaneously using for PRS resources at a specific time.

Hereinafter, the necessity of various embodiments will be described.

The network (e.g., BS/location server/LMF) may configure/indicate to the UE a predetermined number of PRS resources for a specific time period based on information reported by the UE according to at least one of the various embodiments described above.

For example, the location server/LMF may determine the number of PRS resources simultaneously transmitted to the UE in a specific 01-DM symbol. In addition, the location server/LMF may configure specific PRS resources that the UE is capable of receiving on the same reception (RX) beam among M PRS resources transmitted at the same time to have the same QCL type-D configuration. By doing so, the UE may be configured not to receive more than N3 PRS resources having different QCL type-D configurations in a specific symbol.

The network may configure appropriate PRS resources to transmit to the UE and/or perform data scheduling based on the report of the UE according to at least one of the various embodiments described above. For example, the network may appropriately divide spatial resources (RX beams/panels) that the UE is capable of simultaneously using for data reception and PRS reception and schedule data in consideration of the division.

Proposal #5 (Simultaneous Processing of LTE PRS and NR PRS)

Method #1

According to various embodiments, multiple tuples of (N, T) may be reported for simultaneous processing for different RATs (e.g., simultaneous processing of the LTE PRS and NR PRS).

For example, the UE may report $(N_1, T_1)$ and/or $(N_1, T_1, BW_{NR\_PRS})$ to the BS/location server/LMF as the DL PRS processing capability only for the NR PRS.

For example, the UE may (additionally and/or separately) report $(N_2, T_2)$ and/or $(N_2, T_2, BW_{NR\_PRS}+BW_{LTE\_PRS})$ to the BS/location server/LMF as the simultaneous processing capability of the LTE PRS and NR PRS.

For example, $N_2 \leq N_1$. In various embodiments, $BW_{NR\_PRS}$ and $BW_{LTE\_PRS}$ may be defined as follows. Unless stated otherwise, the definitions of $BW_{NR\_PRS}$ and $BW_{LTE\_PRS}$ to be described later may be generally applied in the description of various embodiments.

$BW_{NR\_PRS}$: the (maximum) bandwidth of a NR PRS
$BW_{LTE\_PRS}$: the (maximum) bandwidth of an LTE PRS Method #2

According to various embodiments, (N, T, α) may be reported for simultaneous processing for different RATs (e.g., simultaneous processing of the LTE PRS and NR PRS).

For example, the UE may report (N, T) and/or (N, T, 1) to the BS/location server/LMF as the DL PRS processing capability only for the NR PRS.

For example, the UE may report (N, T, α) to the BS/location server/LMF as the simultaneous processing capability of the LTE PRS and NR PRS, where α≤1. This may mean that the UE is capable of processing a time duration of α×N (e.g., α×N ms) within a certain time period/duration/window of T (e.g., T ms).

For example, α≥0.

In Method #1 and/or #2 according to various embodiments, the UE may report information on the SCS and/or numerology of the LTE PRS and/or NR PRS in addition to and/or separately from the above-described reporting contents (information reported according to the above-described various embodiments).

According to various embodiments, the UE may report that the UE is capable of processing the PRS for N ms within a specific time duration of T (e.g., a certain time window (ms)) as the DL NR PRS processing capability.

The UE may perform the cross-correlation operation on a group/set of PRS resources and/or perform the cross-correlation operation for each PRS resource to obtain/calculate a timing measurement for each PRS resource. Thus, according to various embodiments, the UE may not only report a time capable of DL PRS processing but also report information on the number of timing measurements that the UE is capable of obtaining/calculating for a specific time through the cross-correlation operation, so that that the network may recognize the number of timing measurements. For example, assuming that the number of timing measurements obtainable for a specific bandwidth and/or the maximum PRS bandwidth during time T is Q, the UE may report (N, T, Q) to the BS/location server/LMF.

Priority

For positioning in wireless communication systems (e.g., NR system) to which various embodiments are applicable, the UE may receive DL PRS(s) from one or multiple cells/BS s/TRPs. For example, one or multiple PRS resource sets may be configured for each cell/BS/TRP, and each PRS resource set may include one or multiple PRS resources.

For example, since the location server/LMF transmits PRS configuration information cell-specifically in a positioning SIB, it may be difficult to configure the PRS in consideration of all UE capabilities of each UE. In other words, considering that the PRS configuration information is determined/configured by the location server/LMF, it may not be easy for the location server/LMF to know all UE capabilities of each UE.

Thus, the UE may be configured with PRSs in excess of its UE capability. In this case, it may be necessary to determine/define a priority rule for the UE to select/use/process a PRS. For positioning in wireless communication systems (e.g., NR system) to which various embodiments are applicable, the following cases may need to be considered: a case in which reference configurations, (reference) resources, and/or (reference) resource sets are introduced; and a case in which NR and LTE are simultaneously supported.

Various embodiments may be related to priorities between configured PRSs. For example, when the configured PRSs exceed the capability of the UE, a priority rule for the UE to select and process a PRS may need to be determined/defined. According to various embodiments, a reference configuration configured to obtain/determine a reference timing may have the highest priority, and priorities may be defined/determined/configured in descending order of cell/BS/TRP IDs, in descending order of PRS resource IDs, and/or in descending order of PRS resource set IDs. However, various embodiments are not limited thereto, and other embodiments may be provided.

According to various embodiments, the UE may report the DL PRS processing capability of the UE to the BS/location server/LMF. In particular, if the UE is configured with a measurement gap, the UE may report how many DL PRSs the UE is capable of processing. For example, the UE may report the capability according to at least one of the above-described various embodiments.

According to various embodiments, when the UE is configured/instructed to measure and report PRSs in excess of its processing capability, it may be determined which PRS is to be measured and/or reported among DL PRSs from a configured serving cell/BS/TRP and/or neighboring cells/BS s/TRPs. For example, the determination may be made by the UE. Additionally/alternatively, according to various embodiments, the BS/location server/LMF may determine priorities and configure/indicate the priorities to the UE.

It may be difficult for the UE to process all PRSs transmitted from many cells/BS s/TRPs due to processing of received data and/or RS s. Thus, in this case, if no UE operations are defined therefor, the UE may have an error in operation, and as a result, UE positioning accuracy may be significantly degraded. Therefore, there is need for a method of determining priorities.

According to various embodiments, at least one of the following may be considered as a priority rule for determining which PRS is processed in excess of the DL PRS processing capability of the UE. In addition, an operation in consideration of the priority rule may be configured/indicated to the UE. In the description of various embodiments, giving a high priority to something may mean including the thing (with the high priority) in target(s) to be measured and/or processed by the UE. For example, it may be assumed that PRS resources #0, #1, #2, #3, #4, and #5 are configured and information for configuring PRS resource #2 as a reference is received. If the DL PRS processing capability of the UE related to PRS resources is 1, the UE may preferentially include PRS resource #2 with the highest priority in the processing/measurement target. For example, if the DL PRS processing capability of the UE related to PRS resources is 2, the UE may preferentially include PRS resource #2 with the highest priority in the processing/measurement target. Then, the UE may determine/select other PRS resources to be processed/measured by considering that the remaining PRS resources: PRS resources #0, #1, #3, #4, #5 are sorted in decreasing order of priority. Although the above example has been described based on PRS resources, the present disclosure may be similarly applied to PRS resource sets and/or cells/BSs/TRPs.

Unless stated otherwise, giving a high priority to a cell/BS/TRP, PRS resource, and/or PRS resource set may mean the priority given to the corresponding cell/BS/TRP, PRS resource, and/or PRS resource set is higher than priorities given to other cells/BSs/TRPs, PRS resources, and/or PRS resource sets.

Method 1

According to various embodiments, a cell/BS/TRP on which PRS measurement is to be performed may be preferentially selected/determined based on a good channel environment for timing measurements. For example, among multiple cells/BSs/TRPs, a cell/BS/TRP with the best channel environment may be preferentially selected/determined. A good channel environment may be identified/determined based on a measurement related to the channel environment. For example, a high line of sight (LOS) probability may correspond to a good channel environment. To this end, information recognized/acquired in advance based on radio resource management (RRM) measurement and/or information recognized/acquired in advance based on PRS reception may be used.

Method 2

According to various embodiments, location information on a cell/BS/TRP provided from the location server/LMF may be used, and a higher priority may be given to measurement and/or measurement reporting for a PRS transmitted in a closer cell/BS/TRP than a geographically distant (neighboring) cell/BS/TRP.

Method 3

According to various embodiments, priorities may be determined in ascending and/or descending order of cell/BS/TRP indices/IDs.

Additionally/alternatively, according to various embodiments, priorities may be determined in ascending order and/or descending order of PRS resource set indices/IDs. For example, for a PRS transmitted in a specific cell/BS/TRP, it may be determined which PRS resource set is given with a high measurement/processing priority in ascending and/or descending order of PRS resource set indices/IDs.

Additionally/alternatively, according to various embodiments, for a specific PRS resource set, priorities may be determined in ascending and/or descending order of PRS resource indices/IDs.

Additionally/alternatively, according to various embodiments, the highest priority may be given to a reference cell/BS/TRP, a reference PRS resource set, and/or a reference PRS resource, which is configured/indicated. According to various embodiments, the highest priority may be given to a measurement configured/indicated as the reference (reference cell/BS/TRP, reference PRS resource set, and/or reference PRS resource) and/or reporting of the measurement.

For example, the network may configure/indicate to the UE reference configuration information related to a DL PRS resource available as a reference for measuring a DL RSTD, DL-PRS-RSRP, and/or UE RX-TX time difference. For example, information provided by the reference configuration information may include a cell/BS/TRP ID (e.g., reference cell/BS/TRP ID), a DL PRS resource set ID (e.g., reference PRS resource set ID), one PRS resource ID, and/or a list of DL PRS resource IDs (reference PRS resource IDs). According to various embodiments, the highest priority may be given to a reference cell/BS/TRP, a reference PRS resource set, and/or a reference PRS resource respectively corresponding to the reference cell/BS/TRP ID, the reference PRS resource set ID, and/or the reference PRS resource ID included in the information provided by the reference configuration information. For example, the UE may use, as the reference, a DL PRS resource set ID and/or a DL PRS resource (and/or a cell/BS/TRP ID) provided by the reference configuration information. Additionally/alternatively, the UE may use, as the reference, a DL PRS resource set ID and/or a DL PRS resource (and/or a cell/BS/TRP ID) different from that provided by the reference configuration information (for DL PRS resources included in one DL PRS resource set). However, for example, even when the UE determines the reference using something different from that provided by the reference configuration information, the highest priority may be given to the thing configured/indicated by the reference configuration information (configured/indicated by the reference configuration information as the reference cell/BS/TRP ID, the reference PRS resource set ID, and/or the reference PRS resource ID).

According to various embodiments, DL PRS resources may be sorted (within a positioning frequency layer) in descending order of priority for measurement to be performed by the UE, and the highest measurement priority may be given to the reference configured/indicated by the reference configuration information.

According to various embodiments, it may be assumed that cell/BS/TRP IDs (of the frequency layer) is sorted according to priorities. For example, it may be assumed that the cell/BS/TRP IDs are sorted in descending order of priority.

According to various embodiments, it may be assumed that PRS resource sets for each cell/BS/TRP ID (of the frequency layer) are sorted according to priorities. For example, it may be assumed that the PRS resource sets are sorted in descending order of priority.

For example, if some are sorted in ascending order of priority and others are sorted in descending order of priority, the UE implementation complexity may increase. According to various embodiments, cell/BS/TRP IDs, PRS resource sets, and PRS resources may all be sorted in ascending/descending order of priority. Accordingly, the UE implementation complexity may be reduced.

Unless stated otherwise, ascending/descending order may mean ascending/descending order of related indices/IDs related in the description of various embodiments.

Method 4

According to various embodiments, a high priority may be given to measurement for a specific DL PRS resource and/or DL PRS resource set transmitted from a specific physical cell/BS/TRP configured for the UE as QCL Type-C and/or QCL Type-D. For example, a corresponding PRS may be included in measurement/processing target(s).

Method 5

According to various embodiments, the UE may give a high priority to a specific DL PRS resource and/or DL PRS resource set transmitted from a specific cell/BS/TRP configured/indicated as a PL reference for a specific SRS resource set. Then, the UE may include the specific DL PRS resource and/or DL PRS resource set in a PRS resource and/or PRS resource set to be measured/processed by the UE.

Method 6

According to various embodiments, for the multi-cell RTT scheme, a DL PRS resource and/or DL PRS resource set linked to a specific SRS resource and/or SRS resource set (for example, the SRS may be a positioning SRS configured for UE positioning) may be included in a PRS resource and/or PRS resource set to be measured/processed by the UE, and a high priority may be given thereto.

Method 7

According to various embodiments, a DL PRS resource linked to an SSB and/or CSI-RS as QCL type-D and/or QCL type-C (to include the DL PRS resource in measurement/processing target(s)) may be given with a higher priority than other DL PRS resources.

Method 8

According to various embodiments, the UE may give a higher priority to a PRS resource and/or PRS resource set having a relatively short periodicity than a PRS resource and/or PRS resource set having a relatively long periodicity.

According to various embodiments, Methods 1 to 8 described above may be considered separately as a prioritization method, and/or at least some of Methods 1 to 8 may be combined to configure another prioritization method.

According to various embodiments, the prioritization may be performed by the UE. According to various embodiments, when the UE is configured/indicated with a DL PRS in excess of the DL PRS processing capability of the UE, the UE may determine which DL PRS resource and/or DL PRS resource set the UE needs to measure and/or process. The above-described UE operation may be interpreted to mean that the UE determines the priority of a PRS to be processed/measured.

According to various embodiments, when the UE is configured/indicated with a DL PRS in excess of the DL PRS processing capability of the UE, the UE may perform the prioritization. According to various embodiments, the prioritization may depend on the UE implementation.

Additionally/alternatively, according to various embodiments, priorities may be preconfigured/predefined.

According to various embodiments, when the UE is configured with a PRS in excess of its processing capability, the UE may report such a situation to the BS/location server/LMF and/or request the BS/location server/LMF to configure the PRS again in consideration of the processing capability of the UE.

Additionally/alternatively, according to various embodiments, the UE may request the BS/location server/LMF to further configure/indicate a PRS in consideration of the processing capability of the UE, separately from and/or in addition to the PRS configured by the BS/location server/LMF.

Additionally/alternatively, according to various embodiments, the UE may request a DL PRS transmitted in a specific (physical) cell/BS/TRP.

Additionally/alternatively, according to various embodiments, the UE may request a PRS resource in a specific beam direction transmitted in a specific (physical) cell/BS/TRP.

Additionally/alternatively, according to various embodiments, the UE may request to reduce the periodicity of a preconfigured DL PRS resource and/or DL PRS resource set (for higher-accuracy UE positioning). According to various embodiments, the UE may request to allocate a frequency bandwidth (for the PRS) wider than the preconfigured one.

Additionally/alternatively, according to various embodiments, the UE may request to reduce time and/or frequency resources for a preconfigured PRS resource (if the accuracy of UE positioning does not need to be higher than a certain level). For example, the UE may request to configure a longer periodicity and/or reduce the bandwidth of the PRS resource.

Additionally/alternatively, according to various embodiments, the UE may request the BS/location server/LMF to increase or decrease the transmission power of a specific PRS resource and/or PRS resource set transmitted in a specific cell/BS/TRP. For example, when the UE does not continuously acquire a measurement for the specific PRS resource and/or PRS resource set transmitted from the specific cell/BS/TRP (e.g., when the measurement accuracy is below a certain level), the UE may send a request for a change to the BS/location server/LMF to improve the measurement accuracy.

Additionally/alternatively, according to various embodiments, the UE may request to change time/frequency/transmission power resource configurations for a preconfigured specific positioning SRS resource and/or positioning SRS resource set by considering the transmission power resource and/or positioning accuracy of the UE.

Figure 14:
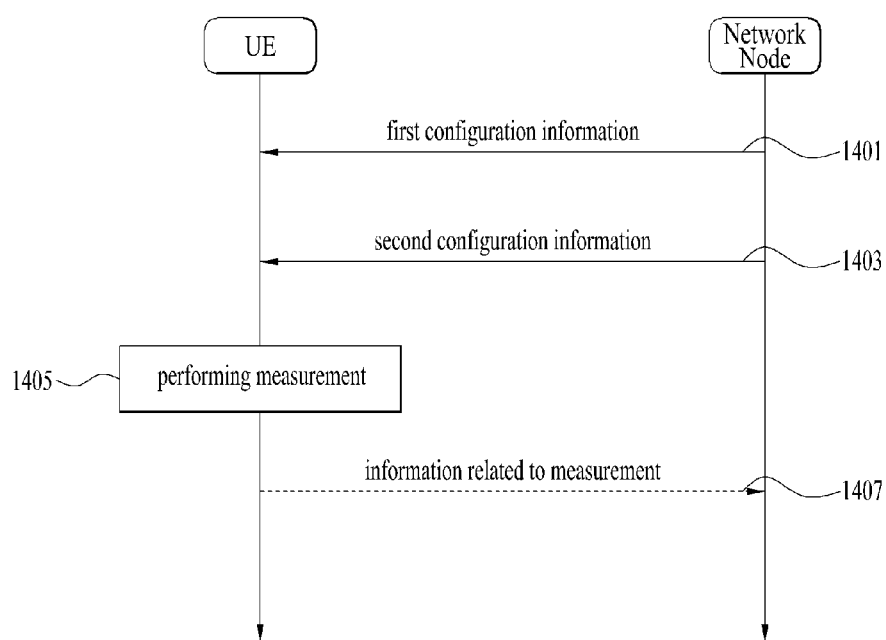
FIG. 14 is a diagram schematically illustrating a method of operating a UE and a network node according to various embodiments.

FIG. 14 is a diagram schematically illustrating a method of operating a UE and a network node according to various embodiments.

Figure 15:
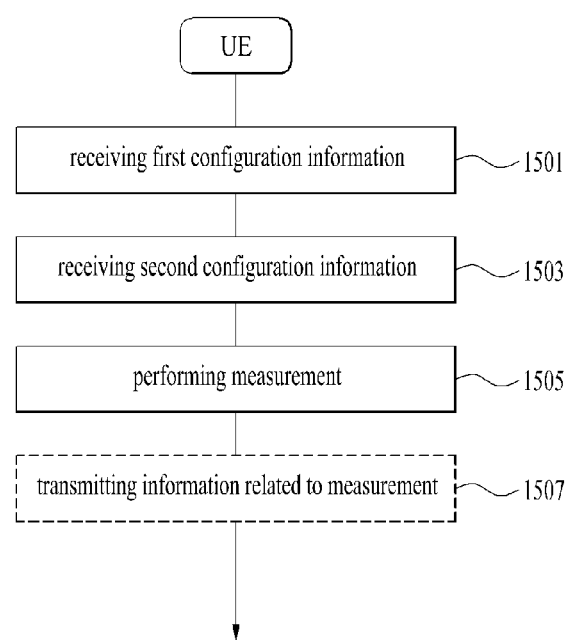
FIG. 15 is a flowchart illustrating a method of operating a UE according to various embodiments.

FIG. 15 is a flowchart illustrating a method of operating a UE according to various embodiments.

Figure 16:
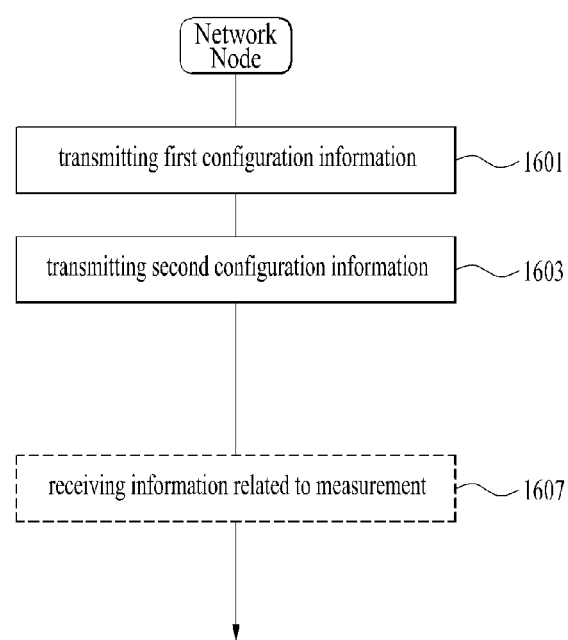
FIG. 16 is a flowchart illustrating a method of operating a network node according to various embodiments.

FIG. 16 is a flowchart illustrating a method of operating a network node according to various embodiments. For example, the network node may be a TP, a BS, a cell, a location server, an LMF, and/or any device performing the same work.

Referring to FIGS. 14 to 16, in operations 1401, 1501, and 1601 according to various embodiments, the network node may transmit first configuration information related to a PRS, and the UE may receive the first configuration information.

According to various embodiments, the first configuration information may include at least one of: (i) information related to at least one PRS resource set, (ii) information related to at least one PRS resource, or (iii) information related to at least one TP.

In operations 1403, 1503, and 1603 according to various embodiments, the network node may transmit second configuration information indicating a reference, and the UE may receive the second configuration information.

According to various embodiments, the second configuration information may include at least one of: (i) information related to at least one reference PRS resource set, (ii) information related to at least one reference PRS resource, or (iii) information related to at least one reference TP.

In operations 1405 and 1505 according to various embodiments, the UE may perform measurement based on (i) the first configuration information and (ii) priorities for the measurement.

According to various embodiments, the reference indicated by the second configuration information may be identified as the highest priority in relation to the priorities. For example, at least one of (i) the at least one reference PRS resource set, (ii) the at least one reference PRS resource, or (iii) the at least one reference TP may be identified as the highest priority in relation to the priorities.

In operations 1407, 1507, and 1607 according to various embodiments, the UE may transmit information related to the measurement (e.g., information including results of the measurement), and the network node may receive the information related to the measurement.

Operations 1401, 1403, 1405, 1407, 1501, 1503, 1505, 1507, 1601, 1603, and 1607 according to various embodiments are not all essential, and one or more operations may be dropped. For example, operations 1407, 1507, and 1607 may be dropped.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various embodiments

4.1. Exemplary Configurations of Devices to Which Various Embodiments are Applied FIG. 17 is a diagram illustrating a device that implements various embodiments.

Figure 17:
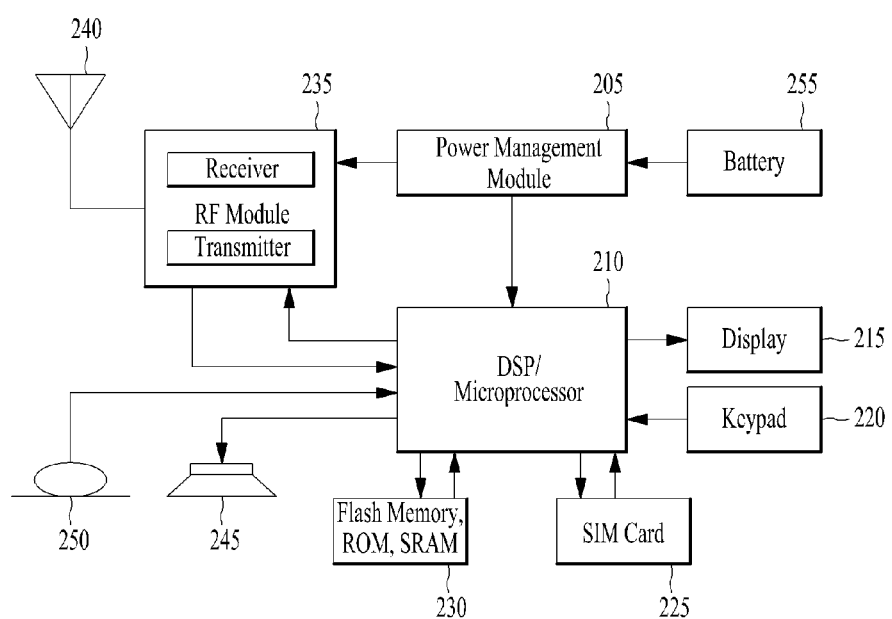
FIG. 17 is a block diagram illustrating an apparatus for implementing various embodiments of the present disclosure.

The device illustrated in FIG. 17 may be a UE and/or a BS (e.g., eNB or gNB or TP) and/or a location server (or LMF) which is adapted to perform the above-described mechanism, or any device performing the same operation.

Referring to FIG. 17, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 17 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 17 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver. The TP and/or the BS and/or the cell and/or the location server and/or the LMF and/or any device performing the same operation may be referred to as a network node.

According to various embodiments, the at least one processor included in the UE (or the at least one processor of the communication device included in the UE) may receive first configuration information related to a PRS.

According to various embodiments, the at least one processor included in the UE may receive second configuration information indicating a reference.

According to various embodiments, the at least one processor included in the UE may perform measurement based on (i) the first configuration information and (ii) priorities for the measurement.

According to various embodiments, the first configuration information may include at least one of: (i) information related to at least one PRS resource set, (ii) information related to at least one PRS resource, or (iii) information related to at least one TP.

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as the highest priority in relation to the priorities.

According to various embodiments, at least one PRS resource identifier (ID) may be assigned to the at least one PRS resource, respectively.

According to various embodiments, the at least one PRS resource may be sorted in descending order of the priorities.

According to various embodiments, at least one PRS resource set ID may be assigned to the at least one PRS resource set, respectively.

According to various embodiments, the at least one PRS resource set may be sorted according to the priorities.

According to various embodiments, at least one TP ID may be assigned to the at least one TP, respectively.

According to various embodiments, the at least one TP may be sorted according to the priorities.

According to various embodiments, at least one of the following: (i) the at least one reference PRS resource set is included in the at least one PRS resource set; (ii) the at least one reference PRS resource is included in the at least one PRS resource; or (iii) the at least one reference TP is included in the at least one TP may be satisfied. According to various embodiments, the at least one reference PRS resource set may have the highest priority among the at least one PRS resource set, the at least one reference PRS resource may have the highest priority among the at least one PRS resource, and/or the at least one reference TP may have the highest priority among the at least one TP.

According to various embodiments, when at least one of: (i) the number of the at least one PRS resource set, (ii) the number of the at least one PRS resource, or (iii) the number of the at least one TP exceeds the PRS processing capability of the UE, the measurement may be performed based on the priorities.

According to various embodiments, a plurality of PRSs may be received based on the first configuration information.

According to various embodiments, an object for the measurement may be determined from among the plurality of PRSs based on the priorities.

According to various embodiments, identifying the reference indicated by the second configuration information as the highest priority in relation to the priorities may include identifying at least one of: (i) the at least one reference PRS resource set, (ii) the at least one reference PRS resource, or (iii) the at least one reference TP as the highest priority in relation to the priorities.

According to various embodiments, the at least one processor included in the network node (or the at least one processor of the communication device included in the network node) may transmit first configuration information related to a PRS.

According to various embodiments, the at least one processor included in the network node may transmit second configuration information indicating a reference.

According to various embodiments, the at least one processor included in the network node may receive information on measurement related to positioning in response to the first configuration information.

According to various embodiments, the measurement may be based on priorities for the measurement.

According to various embodiments, the first configuration information may include at least one of: (i) information related to at least one PRS resource set, (ii) information related to at least one PRS resource, or (iii) information related to at least one TP.

According to various embodiments, the second configuration information may include at least one of: (i) information related to at least one reference PRS resource set, (ii) information related to at least one reference PRS resource, or (iii) information related to at least one reference TP.

According to various embodiments, the reference indicated by the second configuration information may be identified as the highest priority in relation to the priorities.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to Which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
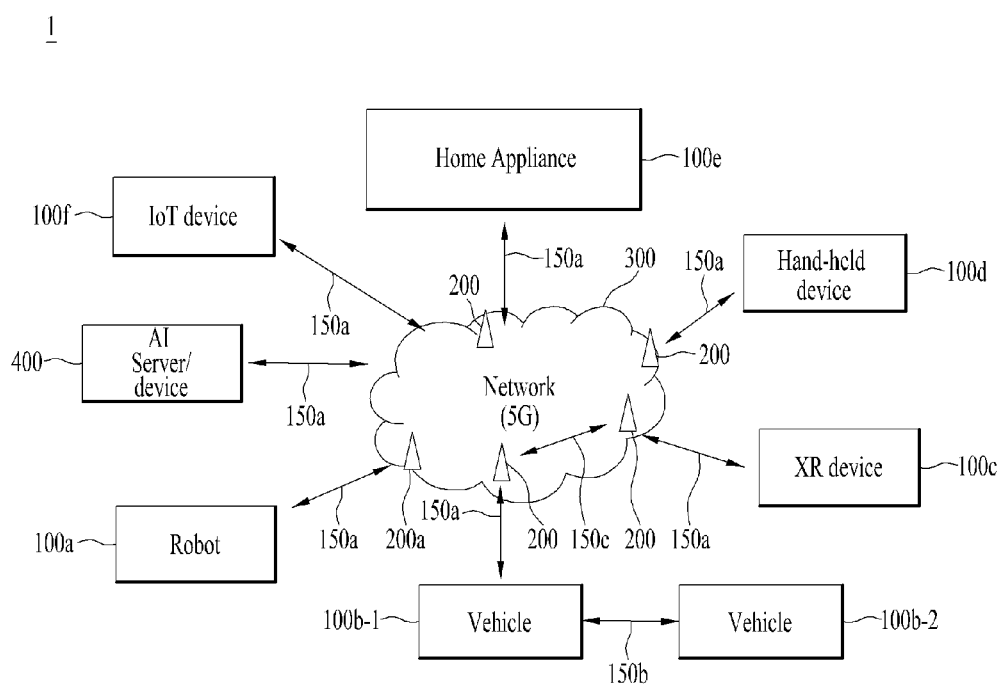
FIG. 18 illustrates an exemplary communication system to which various embodiments of the present disclosure are applied.

FIG. 18 illustrates an exemplary communication system to which various embodiments of the present disclosure are applied.

Referring to FIG. 18, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 19:
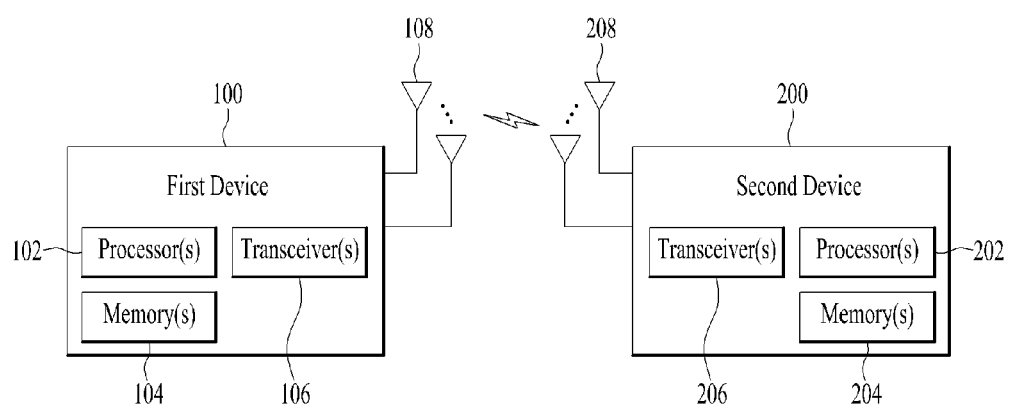
FIG. 19 illustrates exemplary wireless devices to which various embodiments of the present disclosure are applicable.

Example of Wireless Devices to Which Various Embodiments of the Present Disclosure are Applied FIG. 19 illustrates exemplary wireless devices to which various embodiments of the present disclosure are applicable.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 20:
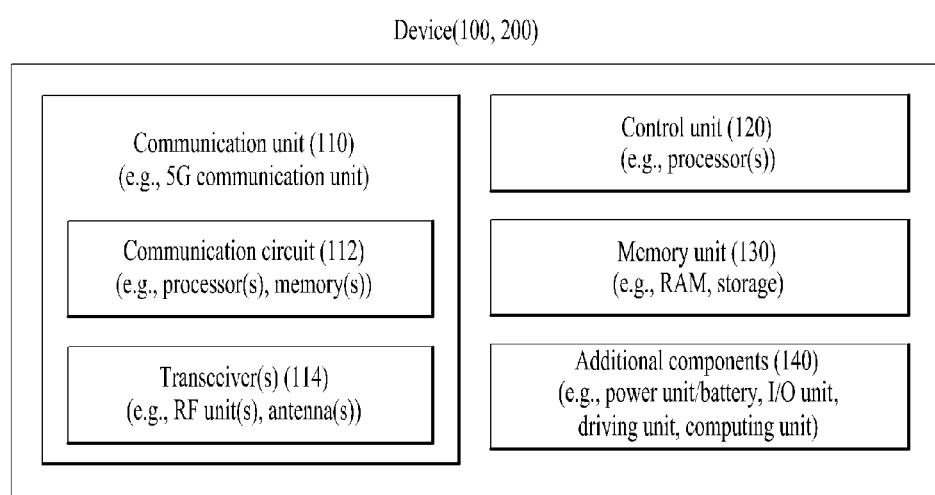
FIG. 20 illustrates other exemplary wireless devices to which various embodiments of the present disclosure are applied.

Example of Using Wireless Devices to Which Various Embodiments of the Present Disclosure are Applied FIG. 20 illustrates other exemplary wireless devices to which various embodiments of the present disclosure are applied. The wireless devices may be implemented in various forms according to a use case/service (see FIG. 18).

Referring to FIG. 20, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BS s (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
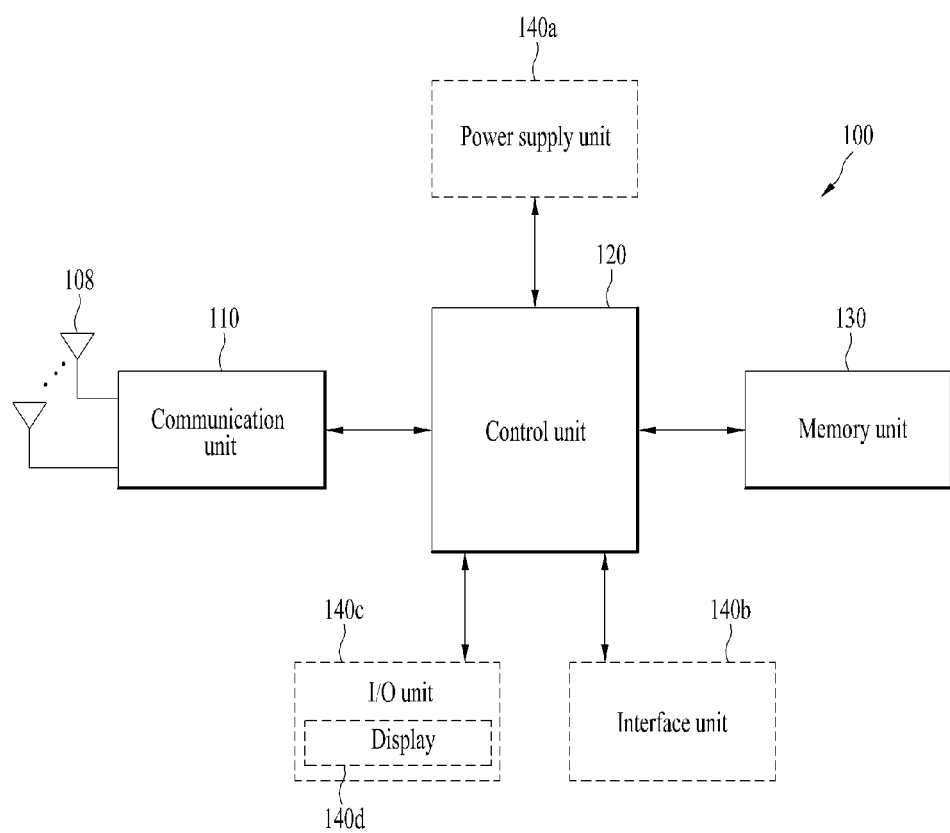
FIG. 21 illustrates an exemplary portable device to which various embodiments of the present disclosure are applied.

Example of Portable Device to Which Various Embodiments of the Present Disclosure are Applied FIG. 21 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 21, a hand-held device 100 may include an antenna unit 108, a communication unit 110, a control unit 120, a memory unit 130, a power supply unit 140a, an interface unit 140*b,* and an I/O unit 140*c.* The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d,* a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 22:
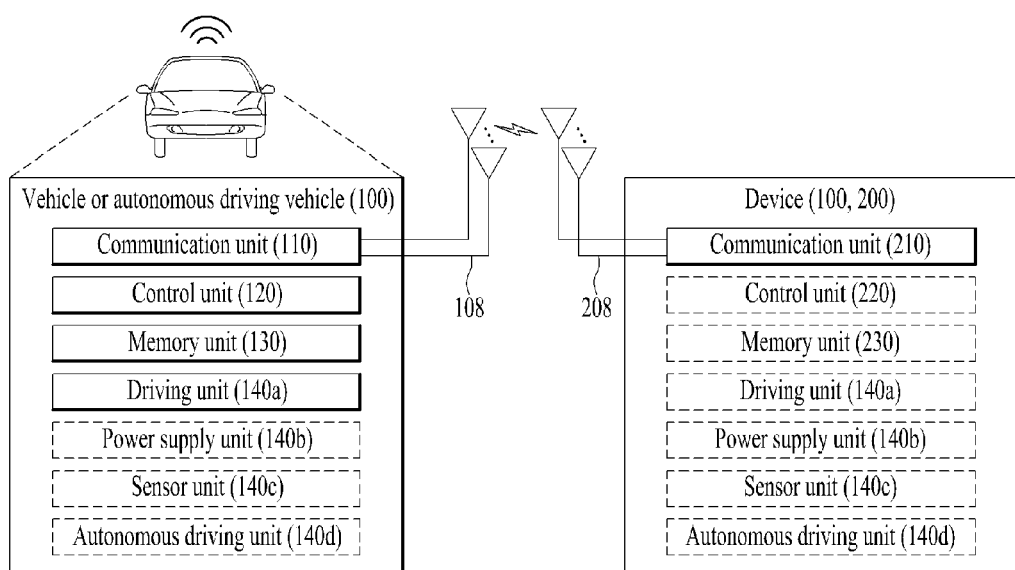
FIG. 22 illustrates an exemplary vehicle or autonomous driving vehicle to which various embodiments of the present disclosure.

Example of Vehicle or Autonomous Driving Vehicle to Which Various Embodiments of the Present Disclosure FIG. 22 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140*a,* a power supply unit 140*b,* a sensor unit 140*c,* and an autonomous driving unit 140*d.* The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BS s (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat Ml, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
  receiving positioning reference signal (PRS) resource configuration information and PRS reference configuration information; and
  performing a measurement based on the PRS resource configuration information and a priority for the measurement,
  wherein a reference configured through the PRS resource configuration information has a highest priority for the measurement,
  wherein each of PRS resources is allocated with each PRS resource identifier (ID), respectively, and
  wherein the PRS resources are sorted in decreasing order of the priority for measurement.

2. The method of claim 1, wherein the PRS resource configuration information comprises information related to PRS resource sets.

3. The method of claim 2, wherein each PRS resource set is allocated with each PRS resource set ID.

4. The method of claim 2, wherein at least one of the PRS resource sets is configured as a reference PRS resource set based on the PRS reference configuration information.

5. The method of claim 1, wherein at least one of the PRS resources is configured as a reference PRS resource based on the PRS reference configuration information.

6. The method of claim 1, wherein upon exceeding a PRS processing capability of the UE, the measurement is performed based on the priority.

7. The method of claim 1, wherein performing the measurement comprises:
  receiving a plurality of PRSs based on the PRS resource configuration information,
  wherein an object for the measurement is determined from among the plurality of PRSs based on the priority.

8. The method of claim 1, wherein the PRS resource configuration information comprises at least one of a reference PRS resource set and a reference PRS resource.

9. A non-transitory computer readable medium storing instruction, when executed by a processor, that cause the processor to perform operations comprising:
  receiving positioning reference signal (PRS) resource configuration information and PRS reference configuration information; and
  performing a measurement based on the PRS resource configuration information and a priority for the measurement,
  wherein a reference configured through the PRS resource configuration information has a highest priority for the measurement, wherein each of PRS resources is allocated with each PRS resource identifier (ID), respectively, and wherein the PRS resources are sorted in decreasing order of the priority for measurement.

10. A user equipment (UE) operating in a wireless communication system, the UE comprising:

a processor; and a memory configured to store instruction, when executed by a processor, that cause the processor to perform operations, the operations comprising:

receiving positioning reference signal (PRS) resource configuration information and PRS reference configuration information; and performing a measurement based on the PRS resource configuration information and a priority for the measurement, wherein a reference configured through the PRS resource configuration information has a highest priority for the measurement, wherein each of PRS resources is allocated with each PRS resource identifier (ID), respectively, and wherein the PRS resources are sorted in decreasing order of the priority for measurement.

11. The UE of claim 10, wherein the PRS resource configuration information comprises information related to PRS resource sets.

12. The UE of claim 11, wherein each PRS resource set is allocated with each PRS resource set ID.

13. The UE of claim 11, wherein at least one of the PRS resource sets is configured as a reference PRS resource set based on the PRS reference configuration information.

14. The UE of claim 10, wherein at least one of the PRS resources is configured as a reference PRS resource based on the PRS reference configuration information.

15. The UE of claim 10, wherein upon exceeding a PRS processing capability of the UE, the measurement is performed based on the priority.

16. The UE of claim 10, wherein performing the measurement comprises:

receiving a plurality of PRSs based on the PRS resource configuration information, wherein an object for the measurement is determined from among the plurality of PRSs based on the priority.

17. The method of claim 10, wherein the PRS resource configuration information comprises at least one of a reference PRS resource set and a reference PRS resource.

* * * * *